United States Patent [19]
Itoh

[11] Patent Number: 6,036,318
[45] Date of Patent: *Mar. 14, 2000

[54] PROJECTION DISPLAY

[75] Inventor: Yoshitaka Itoh, Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/011,097

[22] PCT Filed: May 29, 1997

[86] PCT No.: PCT/JP97/01819

§ 371 Date: Jan. 27, 1998

§ 102(e) Date: Jan. 27, 1998

[87] PCT Pub. No.: WO97/45768

PCT Pub. Date: Dec. 4, 1997

[30] Foreign Application Priority Data

May 29, 1996 [JP] Japan ................................. 8-135587

[51] Int. Cl.[7] ................................................ G03B 21/14
[52] U.S. Cl. ................................ 353/20; 353/38; 353/31
[58] Field of Search ................................ 353/8, 20, 31, 353/33, 34, 37, 38; 349/5, 8, 9

[56] References Cited

U.S. PATENT DOCUMENTS

| | | | |
|---|---|---|---|
| 5,098,184 | 3/1992 | Van Den Brandt et al. | 353/38 |
| 5,601,351 | 2/1997 | Van Den Brandt | 353/20 |
| 5,826,959 | 10/1998 | Atsuchi | 353/31 |
| 5,865,521 | 2/1999 | Hashizume et al. | 353/20 |
| 5,898,521 | 4/1999 | Okada | 353/20 |

FOREIGN PATENT DOCUMENTS

| | | |
|---|---|---|
| 63-159022 U | 10/1988 | Japan . |
| A1-265206 | 10/1989 | Japan . |
| 3-243912 | 1/1991 | Japan . |
| 3-187696 | 8/1991 | Japan . |
| 4-58242 | 2/1992 | Japan . |
| A4-194921 | 7/1992 | Japan . |
| 3-63690 | 3/1994 | Japan . |
| A8-234205 | 9/1996 | Japan . |

OTHER PUBLICATIONS

[Development Design] Optical Device, Liquid Crystal, "Matsushita Industrial Co., Ltd. Develops Liquid Crystal Projector with Doubled Brightness; Polarized light converting optical system formed with a simpler structure for installation," Nikkei Mechanical Jan. 6, 1997, No. 497, pp. 18–19.

*Primary Examiner*—William Dowling
*Attorney, Agent, or Firm*—Oliff & Berridge, PLC

[57] ABSTRACT

A projection type display apparatus 1 is roughly composed of a polarized light beam illumination device 100, a polarization beam splitter 200, a reflection type liquid crystal device 300, and a projection optical system 500. The polarized light beam illumination device 100 includes a light source unit 110, a first optical element 120 and a second optical element 130, and the light beams emerging from the light source unit 110 are divided into a plurality of intermediate light beams by the first optical element 120 and thereafter converted into polarized light beams having approximately one kind of a polarization direction by the second optical element 130. The polarized light beams are reflected at the polarization beam splitter 200 and modulated by the reflection type liquid crystal device 300 and thereafter projected to a projection surface 600 through the projection optical system 500. According to the projection type display apparatus arranged as described above, the length of a light path is shortened to thereby prevent light loss as well as uneven brightness to a region to be illuminated, by which a projected image having uniform brightness and good quality can be obtained.

27 Claims, 14 Drawing Sheets

PROJECTION TYPE DISPLAY APPARATUS 1

PROJECTION TYPE DISPLAY APPARATUS 4

PROJECTION TYPE DISPLAY APPARATUS

PROJECTION DISPLAY

FIELD OF THE INVENTION

The present invention relates to a projection type display apparatus for projecting and displaying a display image formed by a reflection type modulation element such as a reflection type liquid crystal device on a projection surface.

DESCRIPTION OF THE RELATED ART

Nowadays, there have been well known projection type display apparatuses using a liquid crystal device as a light valve as a method of displaying a large image. FIG. 14 shows an example of the typical arrangement of a projection type display apparatus using three liquid crystal devices as an example of the projection type display apparatuses. A light source unit 110 is composed of a light source lamp 111 and a paraboloidal reflector 112. The light emitted from the light source lamp 111 is reflected at the paraboloidal reflector 112 and enters a dichroic mirror 401. The light is separated to three color lights, that is, red light, green light and blue light by two dichroic mirrors 401, 402 having a wavelength selection property. These color lights illuminate transmission type liquid crystal devices 301R, 301G, 301B corresponding to the respective color lights. The lights pass through the respective transmission type liquid crystal devices, are combined by a cross-dichroic prism 420, and are projected to and displayed on a projection surface 600 through a projection optical system 500. Note, reflection mirrors 403, 404, 405 for reflecting light beams are disposed in the light path of the red light and the light path of the blue light.

A dichroic film is disposed in an X-shape on the cross-dichroic prism 420 used as color combination means. The color combination means of the projection type display apparatus using the three liquid crystal devices can be also realized by the use of two dichroic mirrors in place of the cross-dichroic prism 420. However, the arrangement using the cross-dichroic prism 420 has a feature that a bright projected image can be obtained even if a large diameter projection lens is not used because the distances between the liquid crystal devices 301R, 301G, 301B and the projection optical system 500 can be shortened as compared with the arrangement where the two dichroic mirrors are disposed in parallel with each other.

In the conventional projection type display apparatuses, however, the length of the light path of the light separating portion is considerably increased because dichroic mirrors 401, 402 and reflection mirrors 403, 404, 405 are used, although the length of the light path of the light combining portion can be shortened by the use of the cross-dichroic prism 420. Therefore, the conventional projection type display apparatus has a large amount of light loss in a light separating process and cannot sufficiently make use of the characteristics of the cross-dichroic prism 420.

Further, since the light beams emerging from the light source unit 110 composed of the light source lamp 111 and the paraboloidal reflector 112 have an uneven light intensity distribution in the cross-sectional area thereof, they have such characteristics that the intensity of the illuminating light is large in the vicinity of the optical axis of the light source and is gradually reduced with distance from the optical axis. Therefore, the conventional projection type display apparatus as shown in FIG. 14 has a problem that the light intensity distribution of the illuminating light is uneven in the liquid crystal devices 301R, 301G, 301B as the regions to be illuminated and the image projected to a projection surface 600 have uneven brightness and uneven color.

An object of the present invention is to provide a projection type display apparatus capable of obtaining a brighter projected image by preventing light loss by shortening the length of a light path without the need for using a large diameter projecting lens.

Another object of the present invention is to provide a projection type display apparatus capable of projecting an image having uniform brightness and good quality by lowering the unevenness of the intensity distribution of the illumination light in a region to be illuminated.

SUMMARY OF THE INVENTION

The first aspect of the present invention is a projection type display apparatus comprising a light source; a first optical element for collecting the light beams from the light source and dividing the light beams into a plurality of intermediate light beams; a second optical element disposed on the side of the light emerging surface of the first optical element; only one reflection type modulation element for modulating the light beams emerging from the second optical element; and a polarized light beam selection element disposed on the light path between the second optical element and the reflection type modulation element for reflecting or passing the light beams emerging from the second optical element to reach the reflection type modulation element as well as passing or reflecting the light beams modulated by the reflection type modulation element to reach a projection optical system, wherein, the second optical element comprises a polarized light conversion element for separating each of the intermediate light beams to P-polarized light beams and S-polarized light beams and converting the polarization direction of any one of the P-polarized light beams and the S-polarized light beams to the polarization direction of the other polarized light beams; and a superimposing element disposed on the side of the light emerging surface of the polarized light conversion element which superimposes each of the intermediate light beams on the reflection type modulation element.

According to the above arrangement of the projection type display apparatus of the first aspect of the present invention, because the length of the light path can be greatly shortened, light loss can be minimized. Thus, a very bright projected image can be obtained without the use of a large diameter projection lens.

As the first optical element, a lens array composed of a plurality of light beam dividing lenses disposed in a matrix shape can be used. Unevenness of the brightness can be reduced by dividing the light beams from the light source into a plurality of intermediate light beams by the lens array and superimposing the intermediate light beams on a region to be illuminated, as compared with the case of single light beams. As a result, even if the intensity distribution of the light beams emerging from the light source is uneven in the cross-sectional area thereof, illumination light with uniform brightness can be obtained. In particular, when the light intensity distribution of light beams is not random as found in the light beams emerging from a light source composed of a light source lamp and a reflector such as a paraboloidal reflector or the like, the use of the first optical element can make the light intensity distribution and the light angular distribution of the illumination light very uniform in the region to be illuminated.

The second optical element separates the intermediate light beams to the P-polarized light beams and the S-polarized light beams and thereafter converts the polarization direction of any one of them to the polarization direction of the other and finally superimposes the resulting polarized light beams on the region to be illuminated. Since the conventional projection type display apparatuses can use only one of the P-polarized light beams and S-polarized light beams, they lose a large amount of light. However, since the employment of the second optical element of the present invention permits the use of both of the polarized light beams without wasting them, a bright image can be obtained. Further, since the plurality of divided intermediate light beams are finally superimposed on the region to be illuminated, even if the light intensity distribution of the light beams emerging from the light source is uneven in the cross-sectional area thereof, polarized light beams with uniform brightness can be obtained as illumination light. In particular, even if the intermediate light beams cannot be divided into the P-polarized light beams and the S-polarized light beams of uniform light intensity or uniform spectral characteristics, or even if the light intensity or spectral characteristics of one of the polarized light beams changes in the process for converting the polarization direction, polarized light beams with uniform brightness and color can be obtained as illumination light.

There can be employed, as the polarized light conversion element of the second optical element, a plate-shaped polarized light conversion element which comprises a polarized light separation unit array comprising a plurality of polarized light separation units each having a pair of a polarized light separation surface and a reflection surface, and a selective phase plate including regularly formed $\lambda/2$ phase layers. The employment of the polarized light conversion element permits polarized light conversion to be carried out in a small space without increasing the width of the light beams emerging from the light source.

When the superimposing element is disposed at a position located apart from the polarized light conversion element in the projection type display apparatus of the first aspect of the present invention provided with the second optical element arranged as described above, the distance between the first optical element and the polarized light conversion element can be shortened and the first optical element composed of light beam dividing lenses having a large light collecting ability can be used. As a result, since the size of the images formed by the respective light beam dividing lenses can be reduced, each of the intermediate light beams can be entered only to the polarized light separation surfaces corresponding to them and the light beams are prevented from directly entering the reflection surface. Therefore, the light utilization efficiency can be increased and a brighter projected image can be obtained.

When the superimposing element is attached to the light entering surface of the polarized light beam selection element in this case, light loss caused at the boundary between the superimposing element and the polarized light beam selection element can be prevented, by which the light utilization efficiency can be more increased.

Further, in the first projection type display apparatus of the present invention, a polarizing plate is disposed on the light path between the superimposing element and the polarized light beam selection element or on the light path between the polarized light beam selection element and the projection optical system. When the polarizing plate is disposed at the former position, the degree of polarization of the polarized light beams incident on the polarized light beam selection element can be increased, that is, the degree of polarization of the illumination light illuminating the reflection type modulation element results. When the polarizing plate is disposed at the latter position, the degree of polarization of the polarized light beams emerging from the polarized light beam selection element can be increased, that is, the degree of polarization of the image projected on a display surface or a projection surface through the projection optical system results. Therefore, the disposition of the polarizing plate can increase the contrast of the projected image, by which the projected image of very high quality can be obtained.

A projection type display apparatus of the second aspect of the present invention comprises a light source; a first optical element for collecting the light beams from the light source and dividing the light beams into a plurality of intermediate light beams; a second optical element disposed on the side of the light emerging surface of the first optical element; a color light separation/combination element for separating the light beams emerging from the second optical element to three color light beams as well as combining the color light beams modulated by three reflection type modulation elements for modulating the three color light beams, respectively; and a polarized light beam selection element disposed on the light path between the second optical element and the color light separation/combination element for reflecting or passing the light beams emerging from the second optical element to reach the color light separation/combination element as well as passing or reflecting the light beams combined by the color light separation/combination element to reach a projection optical system, wherein the second optical element comprises a polarized light conversion element for separating each of the intermediate light beams to P-polarized light beams and S-polarized light beams and converting the polarization direction of any one of the P-polarized light beams and the S-polarized light beams to the polarization direction of the other polarized light beams; and a superimposing element disposed on the side of the light emerging surface of the polarized light conversion element superimposes each of the intermediate light beams on the reflection type modulation element.

In the projection type display apparatus of the second aspect of the present invention, since the light separating function and the light combining function are achieved by the same means, the disposition of the dichroic mirrors 401, 402 and the reflection mirrors 403, 404, 405 which are used in the aforesaid conventional projection type display apparatus is not necessary. Thus, the length of the light path can be greatly shortened and light loss can be minimized. As a result, a very bright projected image can be obtained without the use of a large diameter projection lens.

As the first optical element, a lens array composed of a plurality of light beam dividing lenses disposed in a matrix shape can be used. Unevenness of the brightness can be reduced by dividing the light beams from the light source into a plurality of intermediate light beams by the lens array and superimposing the intermediate light beams on a region to be illuminated, as compared with the case of single light beams. As a result, even if the intensity distribution of the light beams emerging from the light source is uneven in the cross-sectional area thereof, illumination light with uniform brightness can be obtained. In particular, when the light intensity distribution of light beams is not random, as found in the light beams emerging from a light source composed of a light source lamp and a reflector such as a paraboloidal reflector or the like, the use of the first optical element can make the light intensity distribution and the light angular distribution of the illumination light very uniform in the region to be illuminated.

The second optical element separates the intermediate light beams to the P-polarized light beams and the S-polarized light beams and thereafter converts the polarization direction of any one of them to the polarization direction of the other and finally superimposes the resulting polarized light beams on the region to be illuminated. Since the conventional projection type display apparatuses can use only one of the P-polarized light beams and S-polarized light beams, they lose a large amount of light. However, since the employment of the second optical element of the present invention permits the use of both of the polarized light beams without wasting them, a bright image can be obtained. Further, since the plurality of divided intermediate light beams are finally superimposed on the region to be illuminated, even if the intensity distribution of the light beams from the light source is uneven in the cross-sectional area thereof, polarized light beams with uniform brightness can be obtained as illumination light. In particular, even if the intermediate light beams cannot be divided into the P-polarized light beams and the S-polarized light beams of uniform light intensity and uniform spectral characteristics or even if the light intensity or spectral characteristics of one of the polarized light beams changes in the process of converting the polarization direction, polarized light beams with uniform brightness and color can be obtained as illumination light.

There can be employed, as the polarized light conversion element of the second optical element, a plate-shaped polarized light conversion element which comprises a polarized light separation unit array comprised of a plurality of polarized light separation units each having a pair of a polarized light separation surface and a reflection surface, and a selective phase plate including regularly formed $\lambda/2$ phase layers. The employment of the polarized light conversion element permits polarized light conversion to be carried out in a small space without increasing the width of the light beams emerging from the light source.

When the superimposing element is disposed at a position located apart from the polarized light conversion element in the projection type display apparatus of the second aspect of the present invention provided with the second optical element arranged as described above, the distance between the first optical element and the polarized light conversion element can be shortened and the first optical element composed of light beam dividing lenses having a large light collecting force can be used. As a result, since the size of the images formed by the respective light beam dividing lenses can be reduced, each of the intermediate light beams can be entered only to the polarized light separation surfaces corresponding to them and the light beams are prevented from directly entering the reflection surface. Therefore, the light utilization efficiency can be increased and a brighter projected image can be obtained.

When the superimposing element is attached to the light entering surface of the polarized light beam selection element in this case, light loss caused at the boundary between the superimposing element and the polarized light beam selection element can be prevented, by which the light utilization efficiency can be more increased.

When a reflection mirror for changing a light traveling direction about 90 degrees is disposed on the optical path between the light source and the polarized light beam selection element in the projection type display apparatus of the second aspect of the present invention provided with the second optical element arranged as described above, the optical system can be made compact.

When the reflection mirror is composed of a dielectric mirror for selectively reflecting only particular polarized light beams obtained by the polarized light conversion element and disposed on the optical path between the polarized light conversion element and the superimposing element, the degree of polarization of the polarized light beams incident on the polarized light beam selection element can be increased, that is, the degree of polarization of the illumination light illuminating the reflection type modulation element as a result. Therefore, the contrast of a projected image can be increased, by which the projected image of very high quality can be obtained.

There can be employed, as the polarized light conversion element of the second optical element, a polarized light conversion element which is composed of a polarized light separation prism and a selective phase plate having regularly formed $\lambda/2$ phase layers, the polarized light separation prism being made by a triangular prism having an inclined surface with a polarized light separation film and a plate-shaped prism having a surface with a refection film, the polarized light separation film being approximately in parallel with the reflection film. With the thus arranged polarized light conversion element, polarized light conversion can be carried out in a small space without increasing the width of the light beams emerging from the light source. Further, since the employment of the polarized light conversion element permits the polarized light conversion to be carried out and at the same time the light traveling direction to be changed about 90 degrees, the optical system can be made compact without the disposition of a reflection mirror for changing the light traveling direction.

In the projection type display apparatus of the second aspect of the present invention, the color light separation/combination element is composed of a dichroic prism having a dichroic film disposed between two prism parts; and the polarized light beam selection element is composed of a polarization beam splitter having a polarized light beam selection film disposed between two prism parts, wherein one of the two prism parts constituting the dichroic prism is integrally arranged with one of the two prism parts constituting the polarization beam splitter.

In the projection type display apparatus of the second aspect of the present invention, the color light separation/combination element includes first and second dichroic prisms each having a dichroic film disposed between two prism parts, wherein one of the two prism parts constituting the first dichroic prism is integrally arranged with one of the prism parts constituting the second dichroic prism.

In addition, a light transmission prism is further disposed to the color light separation/combination element and one of the prism parts constituting the first or second dichroic prism is integrally arranged with the light transmission prism.

The integral arrangement of the prism parts can prevent light loss caused at the boundary between the prism parts. Thus, the light utilization efficiency can be more increased, by which a brighter projected image can be obtained.

In the projection type display apparatus of the second aspect of the present invention, the color light separation/combination element is composed of a cross-dichroic prism having a dichroic film disposed between four prism parts in an X-shape; and the three reflection type modulation elements are disposed along the three adjacent sides of the cross-dichroic prism.

With this arrangement, the separation and combination of colors can be carried out by the single cross-dichroic prism. Therefore, even if the three reflection type modulation elements are used, the length of the light path is not increased and light loss can be prevented. As a result, even if the three reflection type modulation elements are used, a very bright projected image without uneven brightness and uneven color can be obtained over an entire display surface or projection surface without the use of a large diameter projection lens.

In the projection type display apparatus using the cross-dichroic prism, the polarized light beam selection element is composed of a polarization beam splitter having a polarized light beam selection film disposed between two prism parts and one of the two prism parts constituting the polarization beam splitter is integrally arranged with any one of the four prism parts constituting the polarization beam splitter.

The integral arrangement of the prism parts can prevent the light loss caused at the boundary between the cross-dichroic prism and the polarization beam splitter. Thus, the light utilization efficiency can be more increased, by which a brighter projected image can be obtained.

In the projection type display apparatus of the second aspect of the present invention, the color light separation/combination element is composed of a dichroic prism in which two dichroic films for separating and combining the three color light beams, respectively are disposed at a different angle with respect to an optical axis.

When the aforesaid cross-dichroic prism is used, there may be a portion where the dichroic films intersect at the center of the prism and the portion may appear as a shadow in a projected image. The phenomenon can be prevented by the employment of the dichroic prism in which the two dichroic films are disposed at a different angle with respect to the optical axis.

Further, in the projection type display apparatus of the second aspect of the present invention, a polarizing plate is disposed on the light path between the light source and the polarized light beam selection element or between the polarized light beam selection element and the projection optical system. When the polarizing plate is disposed at the former position, there can be increased the degree of polarization of the polarized light beams incident on the polarized light beam selection element, that is, the degree of polarization of the illumination light illuminating the reflection type modulation element results. When the polarizing plate is disposed at the latter position, there can be increased the degree of polarization of the polarized light beams emerging from the polarized light beam selection element, that is, the degree of polarization of the image projected on a display surface or a projection surface through the projection optical system results. Therefore, the disposition of the polarizing plate can increase the contrast of the projected image, by which the projected image of very high quality can be obtained.

DETAILED DESCRIPTION OF THE EMBODIMENTS (embodiments) for carrying out the present invention will be described below with reference to the drawings. In the following respective embodiments, three directions which are perpendicular to one another are shown by an X-direction, a Y-direction and a Z-direction for the purpose of convenience and it is assumed that light beams travel in the Z-direction.

(First Embodiment)

Figure 1:
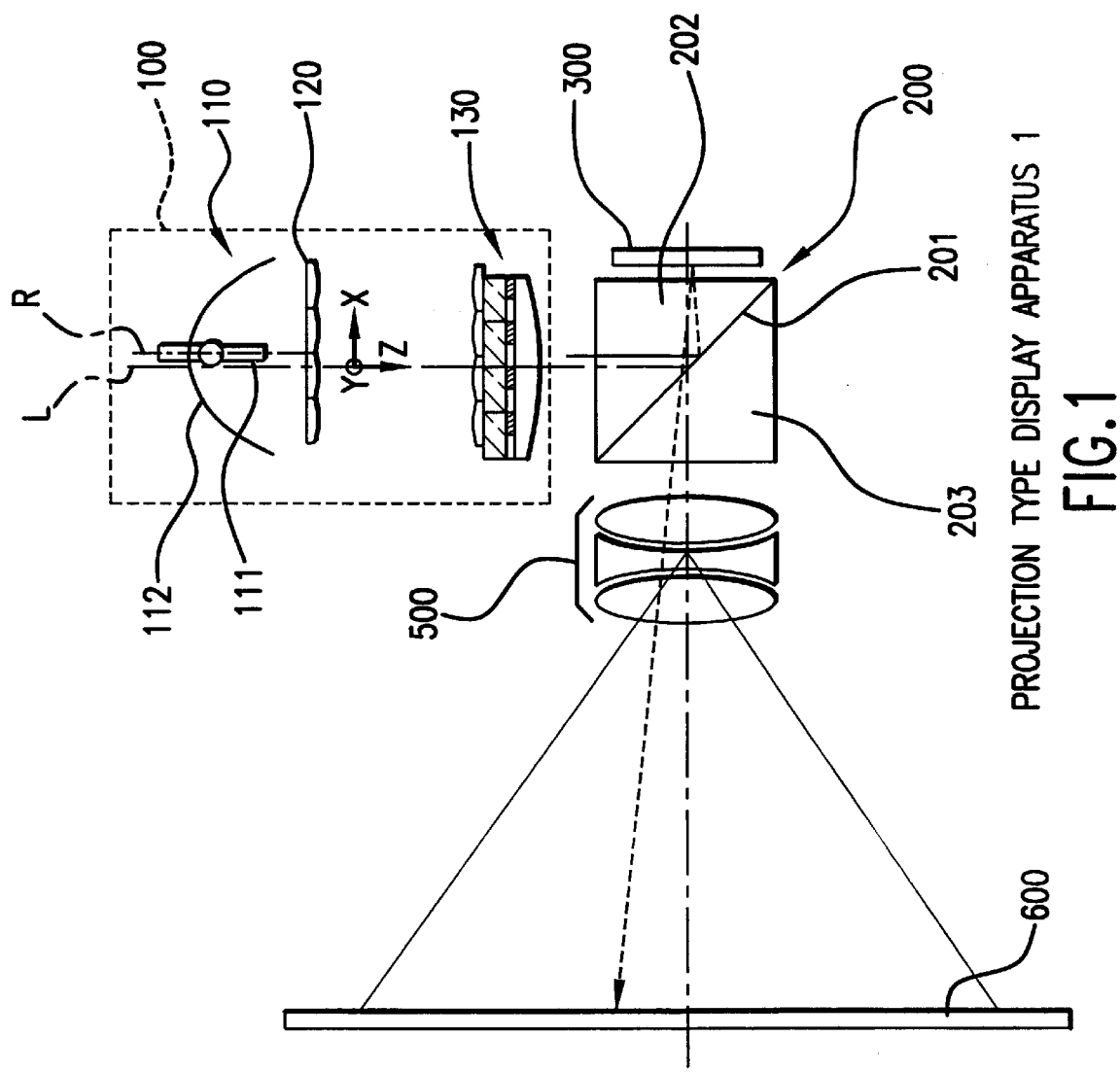
FIG. 1 is a schematic view showing the arrangement of the main portion of a projection type display apparatus 1 of the first embodiment.

FIG. 1 is a schematic view showing the arrangement of the main portion of a projection type display apparatus 1 of the first embodiment in a planar view. Note, FIG. 1 is a sectional view taken along the X-Z plane which passes through the center of a first optical element 120 which will be described later in detail.

The projection type display apparatus 1 of the present invention is roughly composed of a polarized light beam illumination device 100 roughly composed of a light source unit 110, a first optical element 120 and a second optical element 130 which are disposed along a system optical axis L; a polarization beam splitter 200 including an S-polarized light beam reflection film 201 for reflecting the light beams from the polarized light beam illumination device 100 to reach a reflection type liquid crystal device 300 as well as passing the light beams modulated by the reflection type liquid crystal device 300 to reach a projection optical system 500; the reflection type liquid crystal device 300 for modulating the light beams emerging from the polarization beam splitter 200; and the projection optical system 500 for projecting the light beams modulated by the reflection type liquid crystal device 300 to a projection surface 600.

The light source unit 110 is roughly composed of a light source lamp 111 and a paraboloidal reflector 112. The light emitted from the light source lamp 111 is reflected at the paraboloidal reflector 112 in one direction and the resulting light beams enter the first optical element 120 as approximately parallel light beams. A metal halide lamp, a xenon lamp, a high-pressure mercury lamp, a halogen lamp, etc. may be used as the light source lamp 111 and an elliptical reflector, a spherical reflector, etc. may be used as the reflector in addition to the paraboloidal reflector 112 described in this example.

Figure 2:
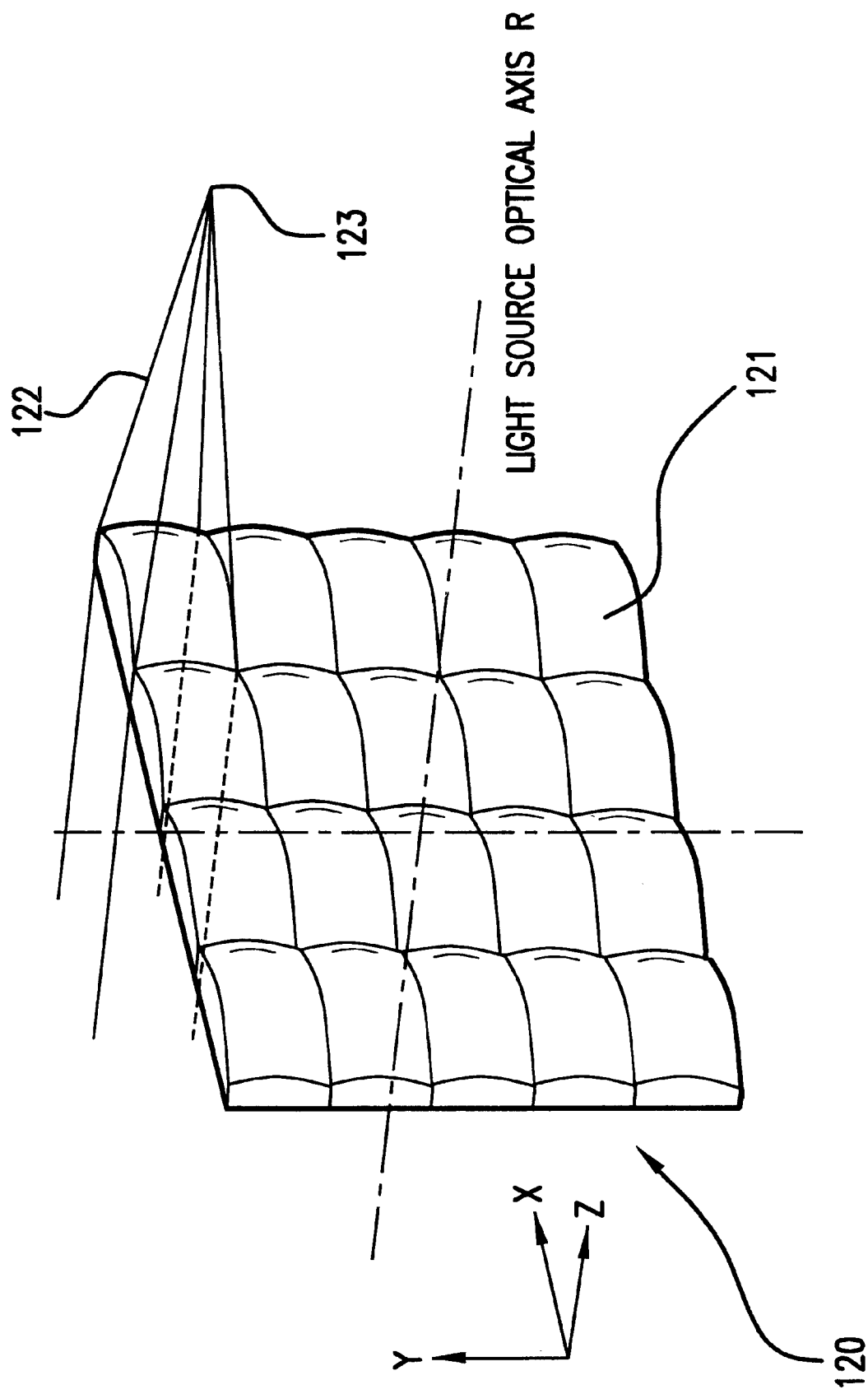
FIG. 2 is a perspective view showing the arrangement of a first optical element 120 in a polarized light beam illumination device 100.

The first optical element 120 is a lens array including a plurality of rectangular light beam dividing lenses 121 disposed in a matrix shape as its outside appearance is shown in FIG. 2. The positional relationship between the light source unit 110 and the first optical element 120 is determined such that a light source optical axis R is located at the center of the first optical element 120. The light beams incident on the first optical element 120 are divided into a plurality of intermediate light beams 122 by the light beam dividing lenses 121 and, at the same time, are collected to form a number of collected light images 123 equal to the number of light beam dividing lenses at the position on a plane (an X-Y plane in FIG. 1) perpendicular to the system optical axis L by the light collecting action of the light beam dividing lenses. Note, it is preferable to design the cross-sectional shape of the light beam dividing lenses 121 on the X-Y plane approximately analogous to the shape of the display region (region to be illuminated) of the reflection type liquid crystal device 300. Since it is assumed in the embodiment that a rectangular region to be illuminated is long in an X-direction on the X-Y plane, the cross-sectional shape of the light beam dividing lenses 121 on the X-Y plane is also arranged in a rectangular shape which is long in the X-direction.

Next, the function of the second optical element 130 will be described based on FIG. 3.

The second optical element 130 is a composite member roughly composed of a plate-shaped polarized light conversion element 140 composed of a light collection lens array 131, a polarized light separation unit array 141 and a selective phase plate 147 and a light emerging side lens 150 for superimposing the intermediate light beams emerging from the polarized light conversion element 140 on a predetermined region to be illuminated 160. The second optical element 130 is disposed on the side of the light emerging surface of the first optical element so that it is approximately perpendicular to the system optical axis L. The second optical element 130 has a function for separating each of the intermediate light beams 122 to P-polarized light beams and S-polarized light beams, thereafter converting the polarization direction of the one polarized light beams to the polarization direction of the other polarized light beams and guiding the respective polarized light beams having the substantially similarly polarization direction to the region to be illuminated 160.

The light collection lens array 131 is composed of a plurality of light collection lenses 132 equal to the number of light beam dividing lenses 121 constituting the first optical element 120 and these light collection lenses 132 are disposed in the same matrix shape as the first optical element 120. The light collection lens array 131 has a function for guiding each of the intermediate light beams 122 while collecting them to a particular position at the polarized light separation unit array 141 as well as making the optical axis of the intermediate light beams 122 parallel with the system optical axis L. Accordingly, it is preferable that the lens characteristics of the respective light collection lenses be optimized, respectively in accordance with the characteristics of the intermediate light beams 122 divided by the first optical element 120 and further in order that the inclination of the main light beam of the light beams incident on the polarized light separation unit array 141 is made parallel with system optical axis L. However, a lens array which is entirely the same as the first optical element 120 or a lens array composed of light collection lenses whose cross-sectional shape on the X-Y plane is approximately analogous to that of the light beam dividing lenses 121 constituting the first optical element 120 may be used in consideration of the cost reduction of the optical system and the ease of design. In the embodiment, the lens array similar to that of the first optical element 120 is used as the light collection lens array 131. Note, when the light beams incident on the first optical element 120 have very high parallelity, the light collection lens array 131 may be omitted from the second optical element.

Figure 4A:
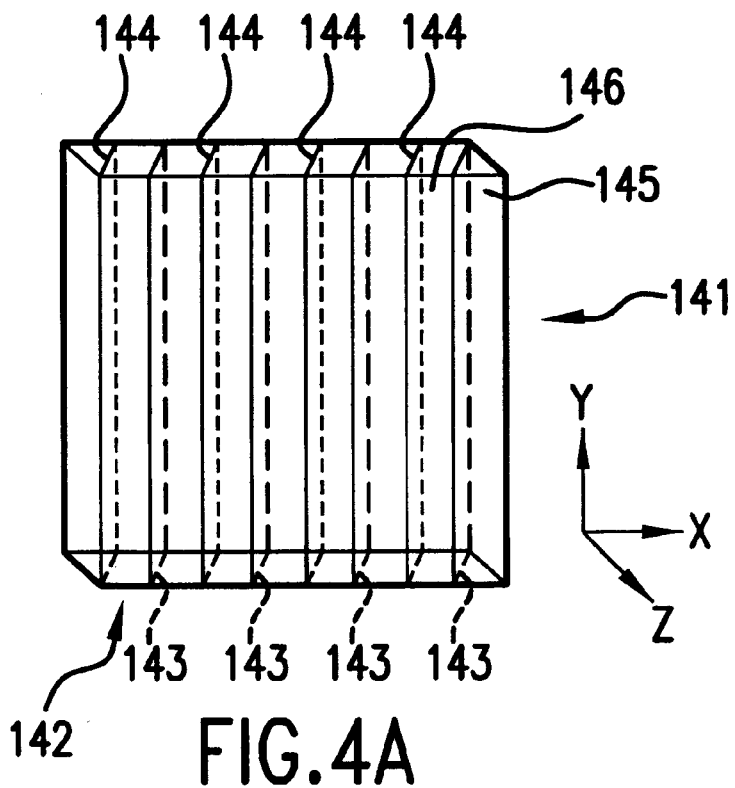
FIG. 4(A) is a perspective view showing the arrangement of a polarized light separation unit array 141 in polarized light beam illumination device 100 and FIG. 4(B) is a perspective view showing the arrangement of a selective phase plate 147 in the polarized light beam illumination device 100.

As shown in FIG. 4(A), the polarized light separation unit array 141 is composed of a plurality of polarized light separation units 142 which are disposed in the X-direction. Each of the polarized light separation units 142 is a quadrangular-column-shaped structural member comprised of a prism composed of optical glass or the like and a pair of a polarized light separation surface 143 and a reflection surface 144 formed therein, and has a function of separating each of the intermediate light beams 122 passing through it, into the P-polarized light beams and the S-polarized light beams. Note, the polarized light separation unit array 141 may be any structure so long as it has the polarized light separation surfaces 143 and the reflection surfaces 144 which are alternately and repeatedly disposed therein and it is not always necessary that the polarized light separation unit array 141 is composed of the plurality of polarized light separation units 142. The concept of the polarized light separation units 142 is introduced here only to make the function of the polarized light separation unit array easily understood.

The polarized light separation surfaces 143 and the reflection surfaces 144 are disposed such that they are ialternately arranged in the X-direction and have an inclination of about 45 degree with respect to the system optical axis L, respectively. The polarized light separation surfaces 143 and the reflection surfaces 144 are disposed so that they do not overlap one another. Further, the area obtained by projecting polarized light separation surface 143 to the X-Y plane is the same as the area obtained by projecting the reflection surface 144 to the X-Y plane. The polarized light separation surface 143 may be composed of a dielectric multilayer or the like and the reflection surface 144 may be composed of an aluminum film or the like.

The light beams incident on the polarized light separation units 142 are separated to the P-polarized light beams passing though the polarized light separation surfaces 143 and the S-polarized light beams whose traveling direction is changed in the direction of the reflection surfaces 144 by being reflected at the polarized light separation surfaces 143. The P-polarized light beams emerge from the P-polarized light beam emerging surfaces 145 of the polarized light separation units 142. Whereas, the S-polarized light beams are reflected at the reflection surfaces 144 and emerge from the S-polarized light beam emerging surfaces 146 of the polarized light separation units 142 approximately in parallel with the P-polarized light beams. That is, the intermediate light beams 122 having random polarization directions incident on the polarized light separation units 142 are separated into the P-polarized light beams and the S-polarized light beams by the polarized light separation units 142 and emerge from the P-polarized light beam emerging surfaces 145 and the S-polarized light beam emerging surfaces 146 of the polarized light separation units 142, respectively in the approximately same direction.

Note, in the polarized light beam illumination device 100 of the embodiment, the respective intermediate light beams 122 must be guided onto the polarized light separation surfaces 143 of the polarized light separation units 142. Therefore, in the embodiment, the light collection lens array 131 is displaced in the X-direction with respect to the polarized light separation unit array 141 by the distance D corresponding to ¼ of the lateral width of the polarized light separation unit 142 so that the intermediate light beams 122 are collected to the centers of the polarized light separation surfaces 143. As a result, the light source unit 110 is also disposed so that the light source optical axis R is shifted by the distance D with respect to the system optical axis L in parallel therewith (see FIG. 3).

Figure 4B:
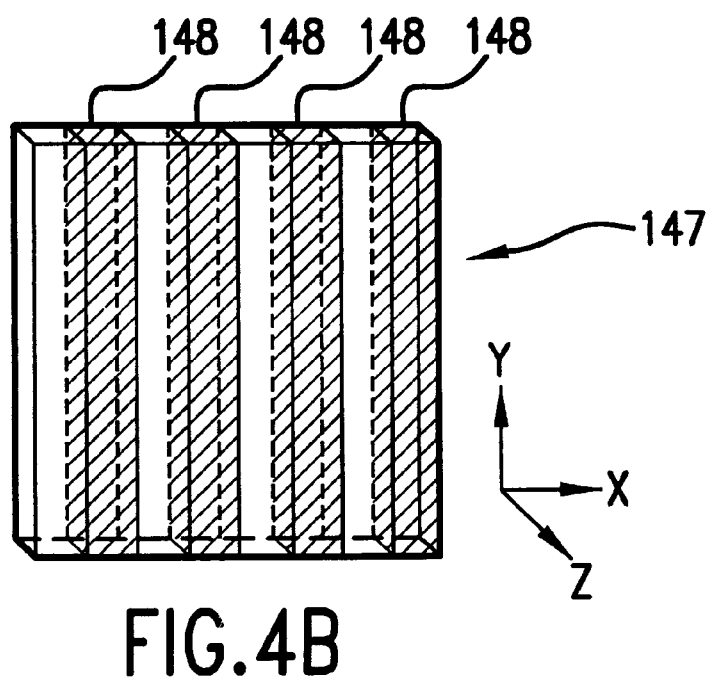

A selective phase plate 147 to which $\lambda/2$ phase layers H148 are regularly formed is disposed on the side of the light beam emerging surface of the polarized light separation unit array 141. FIG. 4(B) shows an example of the selective phase plate 147.

The selective phase plate 147 is an optical element arranged such that the $\lambda/2$ phase layers 148 are formed only on the portion of the P-polarized light beam emerging surfaces 145 of the polarized light separation units 142 and no $\lambda/2$ phase layers 148 are formed on the portion of S-polarized light beam emerging surfaces 146 thereof. Therefore, the P-polarized light beams emerging from the polarized light separation units 142 are subjected to a rotational action in a polarization direction by the $\lambda/2$ phase layers 148 when they pass through the selective phase plate 147 and are converted into the S-polarized light beams. Whereas, since no $\lambda/2$ phase layer 148 is formed on the portion of the S-polarized light beam emerging surfaces 146, the S-polarized light beams emerging from the S-polarized light beam emerging surfaces 146 of the polarized light separation units 142 pass through the selective phase plate 147 unchanged.

That is, the intermediate light beams with the random polarization directions emerging from the first optical element are separated into the P-polarized light beams and the S-polarized light beams by the polarized light separation unit array 141 and are converted into the one kind of the polarized light beams having the similarly arranged polarization direction (the S-polarized light beams in the embodiment) by the selective phase plate 147.

The light emerging side lens 150 (see FIG. 3) disposed on the side of the light beam emerging surface of the polarized light conversion element 140 functions as a superimposing element for superimposing the respective intermediate light beams arranged in S-polarizing order by the polarized light conversion element 140 on a region to be illuminated 160. That is, each of the intermediate light beams 122 divided by the first optical element 120 (that is, image surfaces cut out by the light beam dividing lenses 121) are converted into the kind of polarized light beams having a similar polarization direction by the polarized light conversion element 140 and are superimposed on the region to be illuminated 160 at one position by the light emerging side lens 150. In this case, even if the light intensity distribution of the light beams incident on the first optical element 120 is not uniform in the incident cross-sectional area thereof, since the light intensities of the light beams are averaged in the process in which the light beams divided into the plurality of them are superimposed, the light intensity distribution of illuminating light beams on the region to be illuminated is substantially uniform. Thus, the region to be illuminated 160 can be substantially uniformly illuminated by the one kind of the polarized light beams. Note, it is not necessary for the light emerging side lens 150 to be a single lens member but it may be a lens array composed of a plurality of lenses similar to the first optical element 120.

To summarize, the illuminating light beams which have uniform brightness and whose polarization direction is approximately similarly arranged by the polarized light beam illumination device 100 can be obtained.

The polarized light beam illumination device 100 forms a plurality of fine light collected images 123 by the first optical element 120, makes good use of the space where no light beam exists which is produced in the process of the formation of them and disposes the reflection surfaces 144 of the polarized light separation units 142 in the space. Therefore, the polarized light beam illumination device 100 has a feature that the increase of the width of the light beams, which is caused when the light beams from the light source are separated into two kinds of polarized light beams, can be suppressed and the polarized light beam conversion can be carried out in a small space.

Note, the cross-sectional shape of the light beam dividing lenses 121 constituting the first optical element 120 is formed in a rectangular shape which is long in the X-direction in conformity with the shape of the region to be illuminated 160 formed in a rectangular shape which is long in the X-direction as well as the two kinds of polarized light beams emerging from the polarized light separation unit array 141 are alternately arranged in the X-direction. As a result, even if the rectangular region to be illuminated 160 is illuminated, the light utilization efficiency can be increased without wasting a quantity of light.

Further, the optically integral arrangement of the light collection lens array 131, the polarized light separation unit array 141, the selective phase plate 147 and the light emerging side lens 150, constituting the second optical element 130, permits the light loss caused at the boundaries thereof to be reduced and increases the light utilization efficiency. However, these optical elements need not be always optically integrally arranged.

Description will be made returning to FIG. 1 again.

The polarization beam splitter 200 is arranged such that the S-polarized light beam reflection film 201 is formed on the surface where two prism parts 202, 203 are joined each other. The S-polarized light beam reflection film 201 is composed of a dielectric multilayer or the like and acts as a polarized light beam selection element for reflecting the S-polarized light beams and permitting the P-polarized light beams to pass therethrough. As described above, almost all of the light beams emerging from the polarized light beam illumination device 100 are converted into one kind of the polarized light beams. Therefore, almost all the light beams emerging from polarized light beam illumination device 100 are reflected at the S-polarized light beam reflection film 201 or pass therethrough. In the embodiment, the light beams emerging from the second optical element 130 are S-polarized light beams. Thus, the light beams incident on the polarization beam splitter 200 are almost reflected at the S-polarized light beam reflection film 201 and reach the reflection type liquid crystal device 300.

Note, when the light beams emerging from the second optical element 130 are the P-polarized light beams, the light beams incident on the polarization beam splitter 200 pass through the S-polarized light beam reflection film 201. Therefore, in this case, it suffices only to dispose the reflection type liquid crystal device 300 so that it is in confrontation with the second optical element across the polarization beam splitter 200.

The light beams incident on the reflection type liquid crystal device 300 are subjected to modulation by the reflection type liquid crystal device 300 based on predetermined image information.

Figure 5:
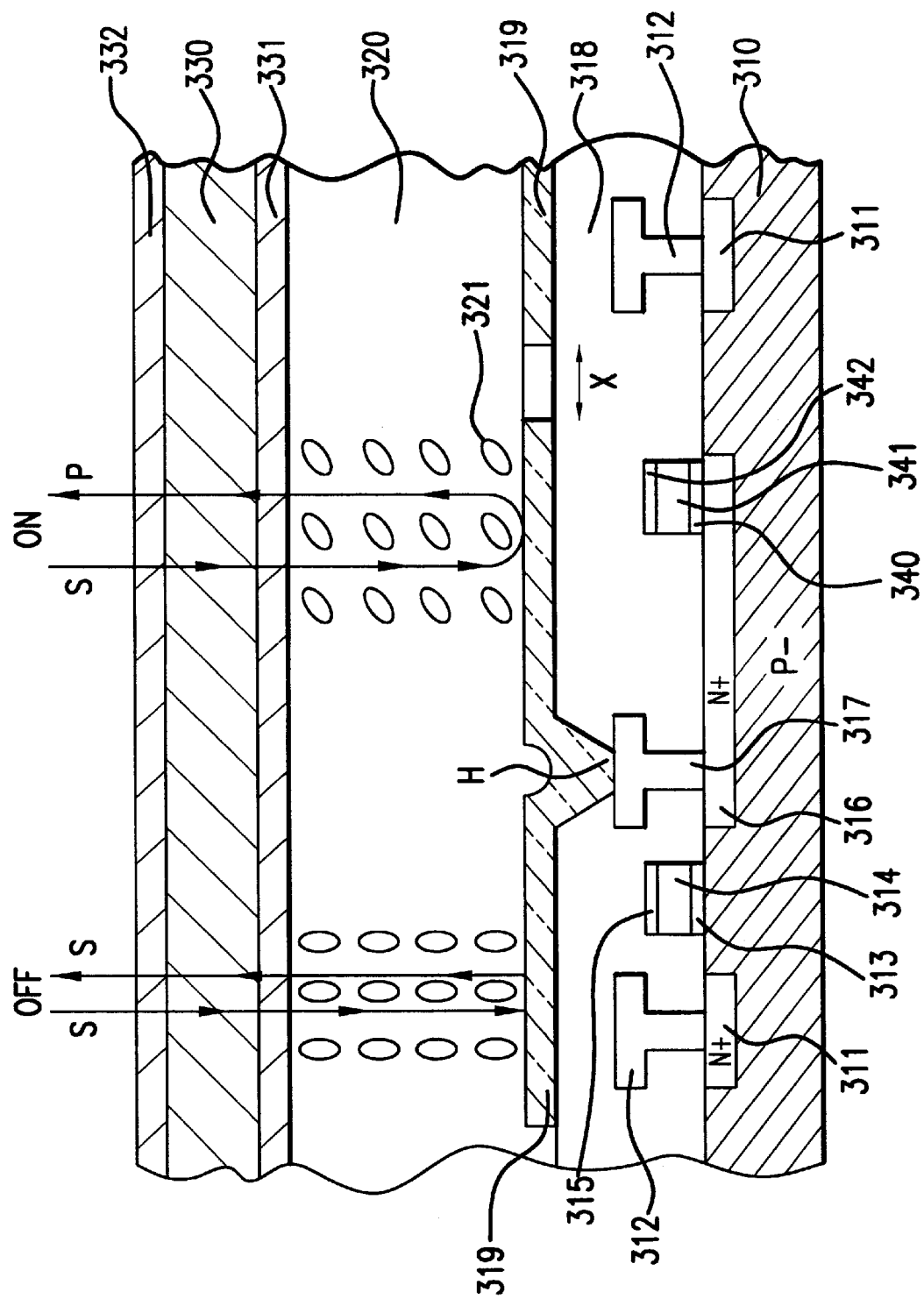
FIG. 5 is a schematic sectional view showing an example of a reflection type liquid crystal device.

An example of the reflection type liquid crystal device 300 is shown in FIG. 5. The reflection type liquid crystal device 300 is an active matrix type liquid crystal device arranged such that switching elements composed of a thin film transistor is connected to reflection pixel electrodes 319 disposed in a matrix shape and a liquid crystal layer 320 is laid between a pair of substrates 310 and 330. The substrate 310 is composed of silicon and sources 311 and drains 316 are formed to a portion thereof. Further, formed on the substrate 310 are source electrodes 312 and drain electrodes 317 each composed of aluminum, channels 313 composed of silicon dioxide, gate electrodes each composed of a silicon layer 314 and a tantalum layer 315, an insulation film 318 and reflection pixel electrodes 319 each composed of aluminum, and the drain electrodes 317 are electrically connected to the reflection pixel electrodes 319 through contact holes H. Since the reflection pixel electrodes 319 are opaque, they can be laminated on the gate electrodes, the source electrodes 312 and the drain electrodes 317 through the insulation film 318. Accordingly, the distance X between the adjacent reflection pixel electrodes 319 can be considerably shortened to thereby increase an aperture ratio.

In the example, there is provided a holding capacitance portion which is composed of the drain 316, a silicon dioxide layer 340, a silicon layer 341 and a tantalum layer 342.

On the other hand, an opposite electrode 331 composed of ITO is formed on the liquid crystal layer 320 side of the surface of the opposite substrate 330 and a reflection preventing layer 332 is formed to the other surface of the substrate 330.

The liquid crystal layer 320 is driven by imposing a voltage between the opposite electrode 331 and the respective reflection pixel electrodes 319.

The liquid crystal layer 320 is of a super-homeotropic type arranged such that when no voltage is imposed on the liquid crystal layer 320 (OFF), liquid crystal molecules 321 are oriented vertically and when a voltage is imposed (ON) thereon, the liquid crystal molecules 321 are twisted 90 degrees. Therefore, as shown in FIG. 5, the S-polarized light beams incident on the reflection type liquid crystal device 300 from the polarization beam splitter 200 when no voltage is imposed (OFF) are returned to the polarization beam splitter 200 from the reflection type liquid crystal device 300 without changing their polarization direction. Thus, they do not reach the projection optical system 500 by being reflected at the S-polarized light beam reflection film 201. On the other hand, the S-polarized light beams incident on the reflection type liquid crystal device 300 from the polarization beam splitter 200, when the voltage is imposed (ON), are made into P-polarized light beams with their polarization direction changed by the twist of the liquid crystal molecules 321, pass through the S-polarized light beam reflection film 201 and thereafter are projected to the projection surface 600 through the projection optical system 500.

As described above, the length of the light pass is very short in the projection type display apparatus 1 of the embodiment. Further, since the aperture ratio of the liquid crystal device can be increased, light loss can be prevented as much as possible. Accordingly, a very bright projected image can be obtained even if a large diameter projection lens is not used.

Further, the polarized light beams having uniform brightness can be obtained as the illuminating light beams by the use of the first optical element and the second optical element, which permits a very bright projected image to be obtained which does not have uneven brightness and uneven color over an entire display surface or projection surface.

Note, the structure of the reflection type liquid crystal device 300, the material of the respective components thereof and the operation mode of the liquid crystal layer 320 are not limited to the examples mentioned above.

Further, although the aforesaid reflection type liquid crystal device 300 is used to display a monochromatic image, it can also display a color image by the provision of a color filter between the reflection type liquid crystal device 300 and the polarization beam splitter 200 or in the reflection type liquid crystal device 300.

(Second Embodiment)

Figure 6:
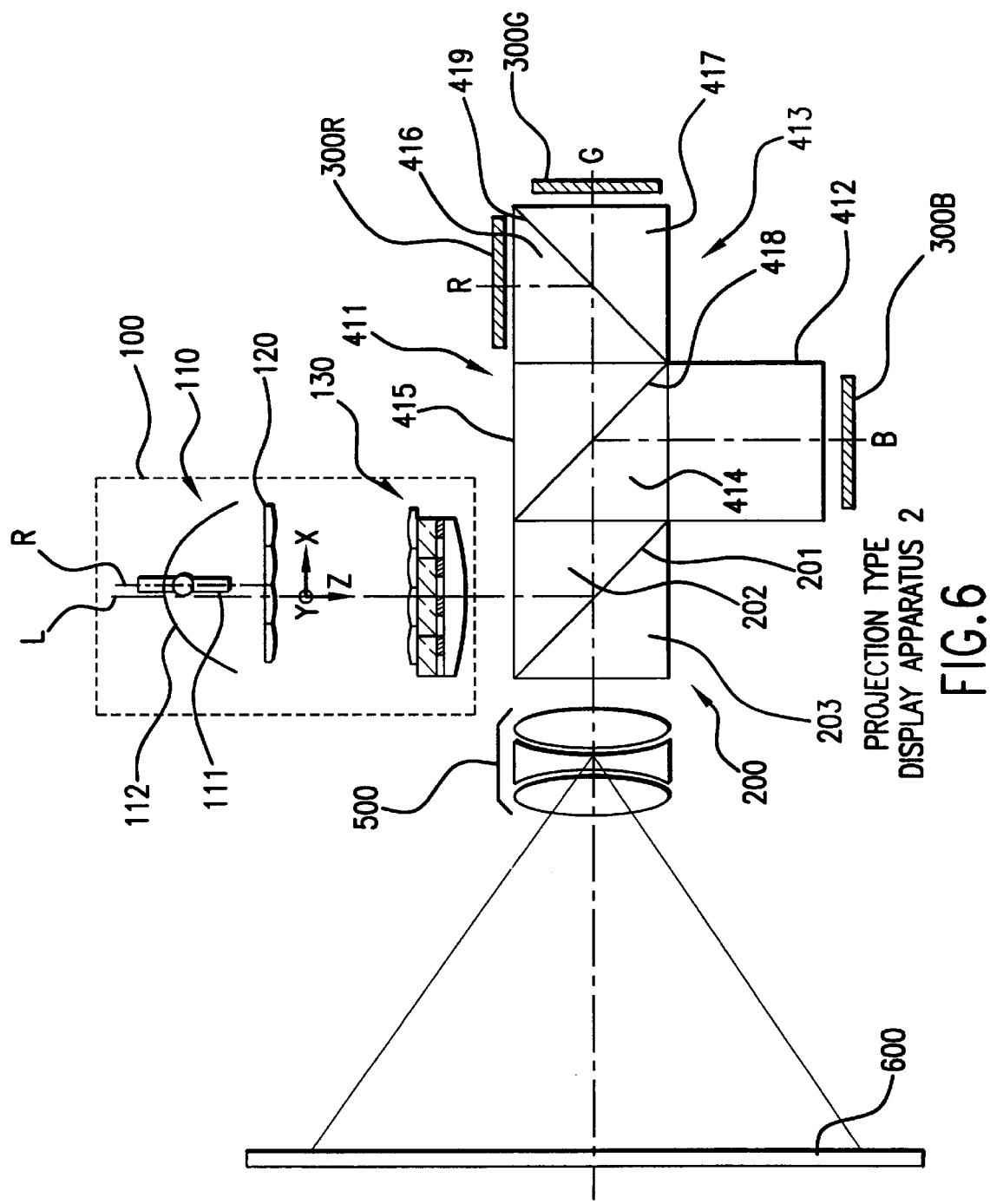
FIG. 6 is a schematic view showing the arrangement of the main portion of a projection type display apparatus 2 of the second embodiment 2.

FIG. 6 is a schematic view showing the arrangement of the main portion of a projection type display apparatus 2 of the second embodiment 2 in a planar view. Note, FIG. 6 is a sectional view taken along the X-Z plane passing through the center of a first optical element 120. In the projection type display apparatus 2 of the embodiment, the same components as those used in the projection type display apparatus 1 of the aforesaid first embodiment are denoted by the same numerals as those used in FIG. 1 to FIG. 5 and the detailed description thereof is omitted.

The projection type display apparatus 2 of the embodiment is roughly composed of a polarized light beam illumination device 100 roughly composed of a light source unit 110, a first optical element 120 and a second optical element 130 which are disposed along a system optical axis L; a polarization beam splitter 200 having an S-polarized light beam reflecting film 201 for reflecting the light beams from the polarized light beam illumination device 100 and causing the reflected light beams to reach a color light separation/combination element composed of dichroic prisms 411 and 413, and a light transmission prism 412, so as to pass the light beams combined by the color light separation/combination element through to reach a projection optical system 500; the color light separation/combination element (the dichroic prisms 411 and 413 and the light transmission prism 412) for separating the light beams emerging from the polarization beam splitter 200 to red light beams (R), green light beams (G) and blue light beams (B) as well as combining the color light beams modulated by reflection type liquid crystal devices 300R, 300G, 300B; the reflection type liquid crystal devices 300R, 300G and 300B for modulating the three color light beams; and the projection optical system 500 for projecting the light beams modulated by the reflection type liquid crystal devices 300R, 300G and 300B to a projection surface 600.

The projection type display apparatus 2 of the embodiment employs the polarized light beam illumination device 100 the arrangement of which is entirely the same as that of the first embodiment. As described in the first embodiment, in the polarized light beam illumination device 100, the light beams emerging at random from the light source unit 110 are divided into a plurality of intermediate light beams by the first optical element 120 and thereafter converted into the one kind of the polarized light beams whose polarization direction is approximately similarly arranged (S-polarized light beams in the embodiment) by the second optical element 130. Then, the S-polarized light beams emerging from the polarized light beam illumination device 100 are reflected at the S-polarized light beam reflecting film 201 of the polarization beam splitter 200.

The light beams reflected at the S-polarized light beam reflecting film 201 are separated to three light beams, that is, the red light beams (R), the green light beams and the blue light beams (B).

The dichroic prism 411 is arranged such that a blue light reflection dichroic film 418 composed of a dielectric multilayer or the like is formed on the surface where two prism parts 414 and 415 are joined each other. The blue light beams (B) among the S-polarized light beams having been reflected at the S-polarized light beam reflecting film 201 are reflected at the blue light reflection dichroic film 418 and enter the reflection type liquid crystal device 300B through the light transmission prism 412. Then, the blue light beams (B) are subjected to modulation by the reflection type liquid crystal device 300B based on predetermined image information. Note, the light transmission prism 412 is used to make the light path of the blue light beams (B) as long as those of the other color light beams.

The dichroic prism 413 is arranged such that a red light reflection dichroic film 419 composed of a dielectric multilayer or the like is formed on the surface where two prism parts 416, 417 are joined each other. The red light beams (R) among the color light beams having passed through the blue light reflection dichroic film 418 of the dichroic prism 411 are reflected at the red light reflection dichroic film 419 and enter the reflection type liquid crystal device 300R. Then, the red light beams (R) are subjected to modulation by the reflection type liquid crystal device 300R based on the predetermined image information.

Further, the green light beams (G) having passed through the red light reflection dichroic film of the dichroic prism 413 enter the reflection type liquid crystal device 300G. Then, the green light beams (G) are subjected to modulation by the reflection type liquid crystal device 300R based on the predetermined image information.

As described above, the red, blue and green light beams having been modulated by the respective reflection type liquid crystal devices 300R, 300B and 300G are combined again by the dichroic prisms 413 and 411 and projected on the projection surface 600 through the projection optical system 500.

The projection type display apparatus 2 of the embodiment can also prevent light loss as much as possible, as in the projection type display apparatus 1, because it has a large aperture ratio, by which a very bright projected image can be obtained.

Further, the polarized light beams having uniform brightness can be obtained as illuminating light beams by the use of the first optical element and the second optical element, which permit a very bright projected image to be obtained which does not have uneven brightness and uneven color over an entire display surface or projection surface.

Note, in the projection type display apparatus 2 of the embodiment, the prism part 202 constituting the polarization beam splitter 200 and the prism part 414 constituting the dichroic prism 411 can be composed as an integrally arranged prism. Further, in the same manner, the prism part 415 and the prism part 416, and the prism part 414 and the light transmission prism 412 can be composed as integrally arranged prisms. The light utilization efficiency can be further increased by the integral arrangements of these prism parts because the light loss caused at the boundaries of the prism parts can be prevented.

(Third Embodiment)

In the projection type display apparatus 2 of the aforesaid second embodiment, the two dichroic prisms 411 and 413 are used as the color light separation/combination element and the light transmission prism 412 is provided to the light path of the blue light to make the length of it as long as the light paths of the other color lights. However, the color light separation/combination element may be composed of a single cross-dichroic prism. An example of the projection type display apparatus is shown in FIG. 7.

Figure 7:
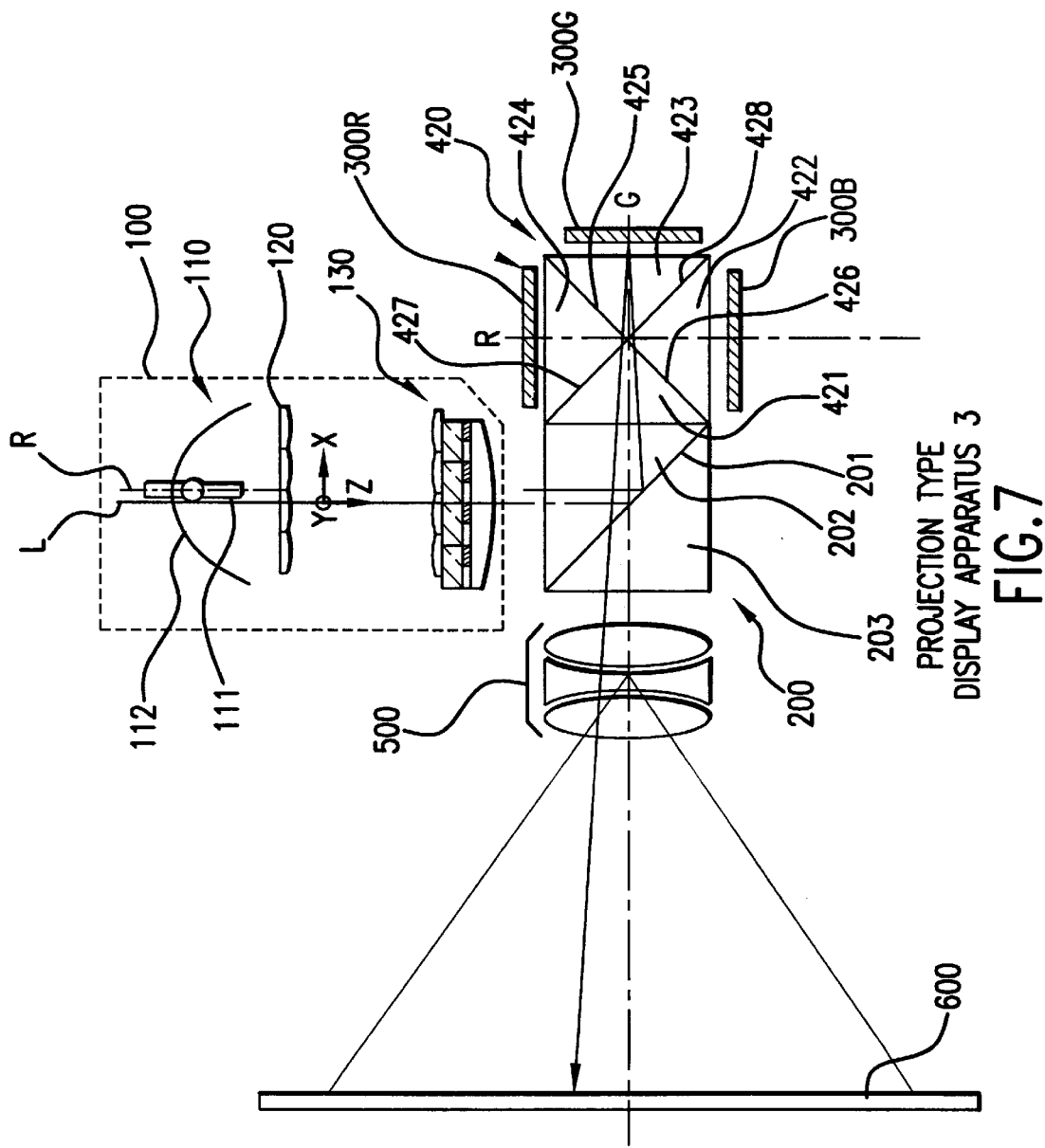
FIG. 7 is a schematic view showing the arrangement of the main portion of a projection type display apparatus 3 of the third embodiment.

FIG. 7 is a schematic view showing the arrangement of the main portion of a projection type display apparatus 3 of the third embodiment in a planar view. Note, FIG. 7 is a sectional view taken along the X-Z plane passing through the center of a first optical element 120. In the projection type display apparatus 3 of the embodiment, the same components as those used in the projection type display apparatus 1 of the aforesaid first embodiment are denoted by the same numerals as those used in FIG. 1 to FIG. 5 and the detailed description thereof is omitted.

The projection type display apparatus 3 of the embodiment uses a cross-dichroic prism 420 in which red light reflection dichroic films 425 and 426 and blue light reflection dichroic films 427 and 728 are disposed in an X-shape between four prism parts 421, 422, 423, and 424 in place of the dichroic prisms 411 and 412 which constitute the color light separation/combination element of the aforesaid projection type display apparatus 2. The use of the cross-dichroic prism 420 can greatly shorten the length of a light path. Therefore, a very bright projected image can be obtained without the use of a large diameter projection lens.

Further, in the projection type display apparatus 3 of the embodiment, a prism part 202 constituting a polarization beam splitter 200 and a prism part 421 constituting the cross-dichroic prism 420 may be composed as an integrally arranged prism. The integral arrangement of the prism parts 202 and 421 can prevent the light loss caused at the boundary of the prism parts 202 and 421, by which a light utilization efficiency can be further increased.

Note, the projection type display apparatus 3 of the embodiment also has the same effect as that of the projection type display apparatus 2.

(Fourth Embodiment)

When the cross-dichroic prism 420 is used as the color light separation/combination element as in the projection type display apparatus 3 of the third embodiment, there exists a portion where the dichroic films cross at right angles at the center of the prism and the portion may appear as a shadow on a projected image. When a dichroic prism 430 as shown in FIG. 8 is employed in place of the cross-dichroic prism 420, this phenomenon can be completely prevented.

Figure 8:
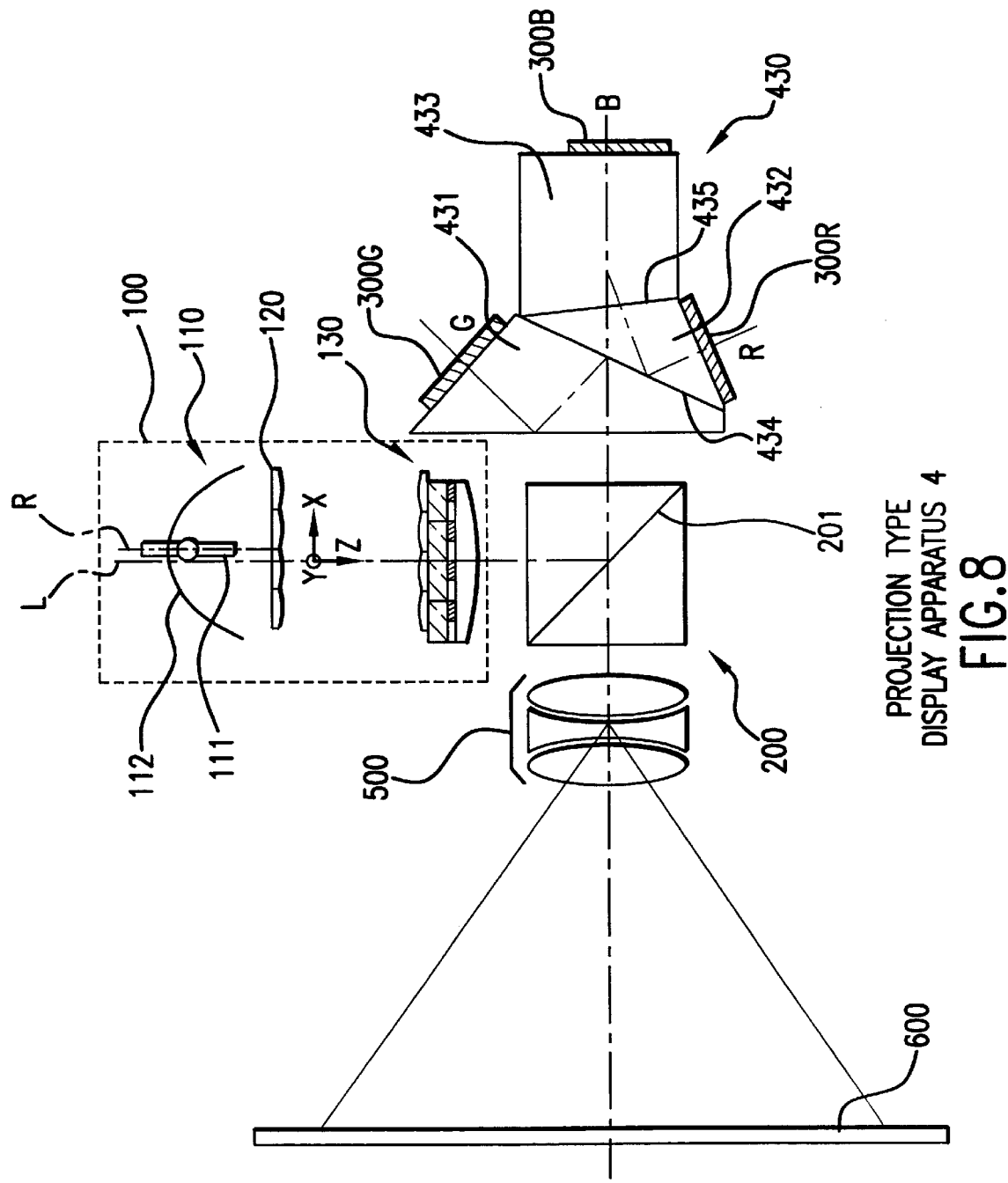
FIG. 8 is a schematic view showing the arrangement of the main portion of a projection type display apparatus 4 of the fourth embodiment.

FIG. 8 is a schematic view showing the arrangement of the main portion of a projection type display apparatus 4 of the fourth embodiment in a planar view. Note, FIG. 8 is a sectional view taken along the X-Z plane passing through the center of a first optical element 120. In the projection type display apparatus 4 of the embodiment, the cross-dichroic prism 420 of the projection type display apparatus 3 of the third embodiment is replaced with the dichroic prism 430 in which two dichroic films are disposed at a different angle with respect to an optical axis. Since the other arrangements of the embodiment are the same as those of the fourth embodiment, the detailed description thereof is omitted.

The dichroic prism 430 is composed of three prism parts 431, 432, and 433 each having a different shape; a green light reflection dichroic film 434 formed on the surface where the prism part 431 is joined to the prism part 432; and a red light reflection dichroic film 435 formed on the surface where the prism part 432 is joined to the prism part 433. The green light reflection dichroic film 434 and the red light reflection dichroic prism 436 are disposed at a different angle with respect to the optical axis. Therefore, the portion where dichroic films cross at right angles does not appear as a shadow on a projected image different from the case that the cross-dichroic prism is used, by which the projected image of very high quality can be obtained.

Note, the projection type display apparatus 4 of the embodiment also has the same effect as that of the projection type display apparatus 3 of the third embodiment.

(Fifth Embodiment)

Figure 9:
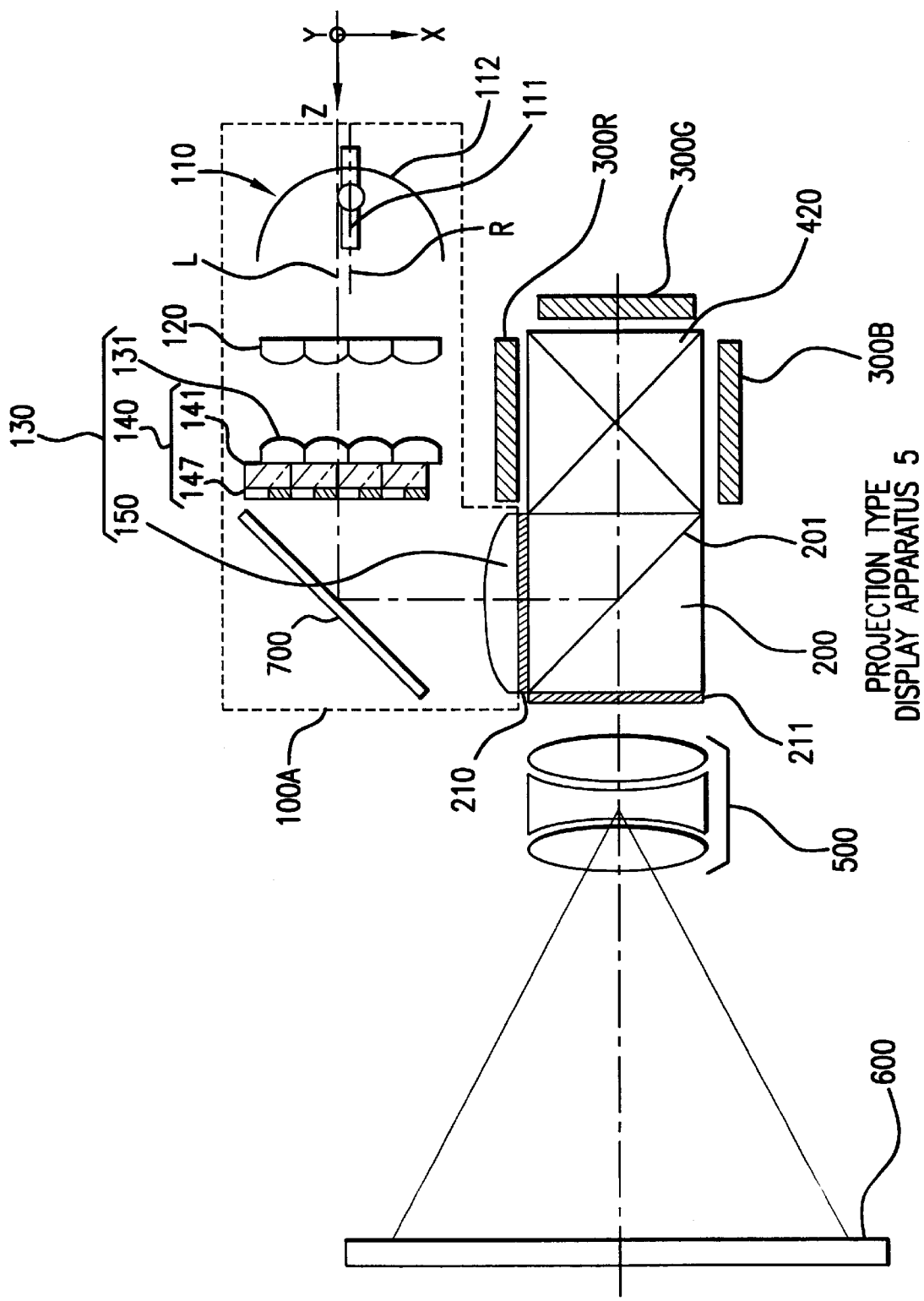
FIG. 9 is a schematic view showing the arrangement of the main portion of a projection type display apparatus 5 of the fifth embodiment.

FIG. 9 is a schematic view showing the arrangement of the main portion of a projection type display apparatus 5 of the fifth embodiment in a planar view. Note, FIG. 9 is a sectional view taken along the X-Z plane passing through the center of a first optical element 120. The projection type display apparatus 5 of the embodiment is a modification of the projection type display apparatus 3 of the aforesaid third embodiment. The same arrangements as those of the projection type display apparatus 3 of the third embodiment are denoted by the same reference numerals as those used in FIG. 7 and the detailed description thereof is omitted.

First, the arrangement of the polarized light beam illumination device of the projection type display apparatus 5 of the embodiment is different from that of the projection type display apparatus 3 of the aforesaid third embodiment. The polarized light beam illumination device 100A of the projection type display apparatus 5 of the embodiment is different from the aforesaid polarized light beam illumination device 100 in that the light emerging side lens 150 is disposed at a position located apart from the polarized light conversion element 140, a reflection mirror 700 is interposed between the polarized light separation unit array 141 and the light emerging side lens 150.

Figure 10:
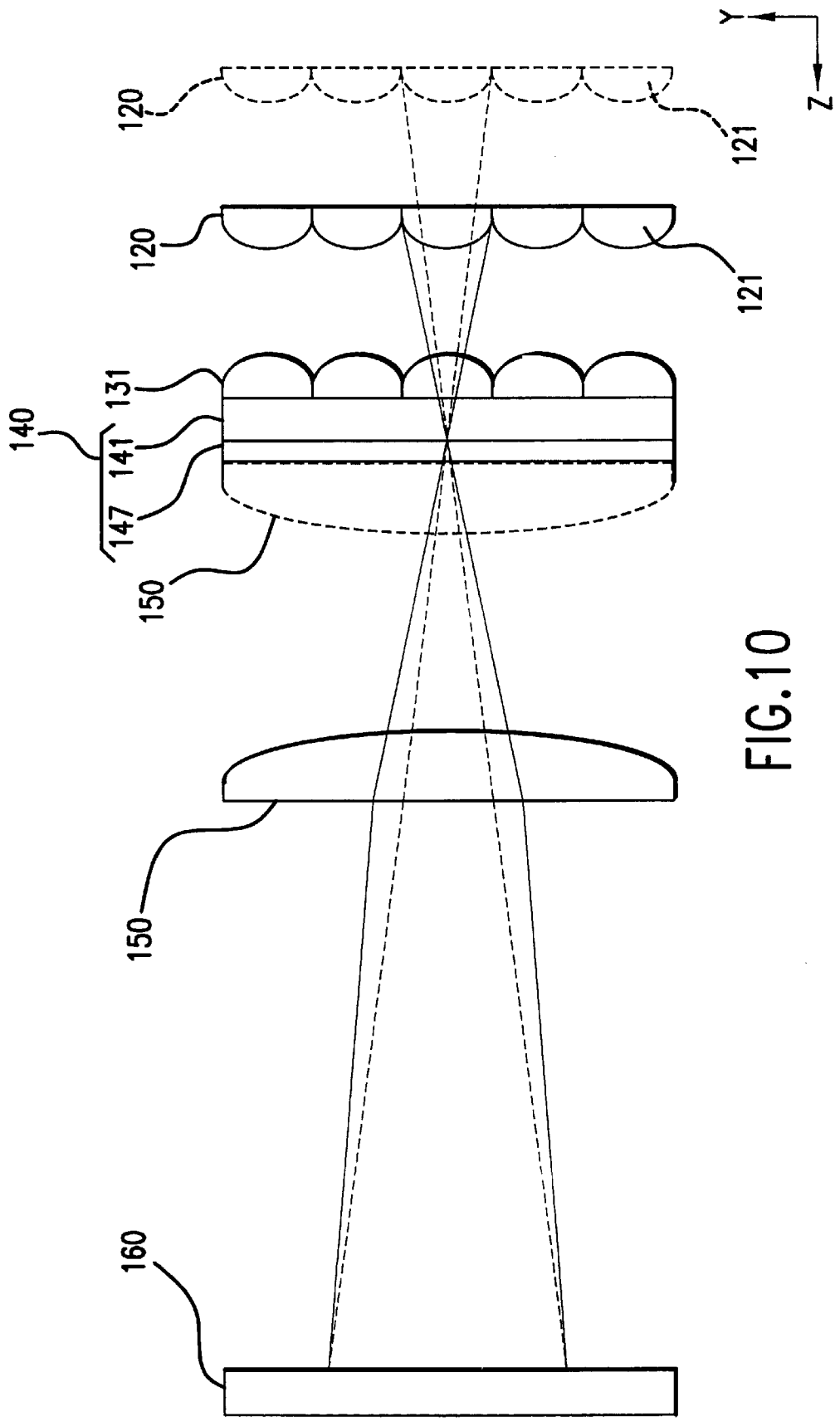
FIG. 10 is a view comparing a polarized light beam illumination device 100A with the polarized light beam illumination device 100.

FIG. 10 is a view comparing the polarized light beam illumination device 100A with the polarized light beam illumination device 100. Portions having no relation to the comparison are omitted for the convenience of description. Solid lines in the figure show the positional relationship between the first optical element 120, the light collection lens array 131, the polarized light conversion element 140 and the light emerging side lens 150 in the projection type display apparatus 5 of the embodiment. Dotted lines in the figure show the state that the polarized light conversion element 140 is not separated from the light emerging side lens 150, that is, the first optical element 120 and the light emerging side lens 150 in the aforesaid polarized light beam illumination device 100. Note, numeral 160 in the figure shows a region to be illuminated by the polarized light beam illumination device 100 or the polarized light beam illumination device 100A.

Figure 3:
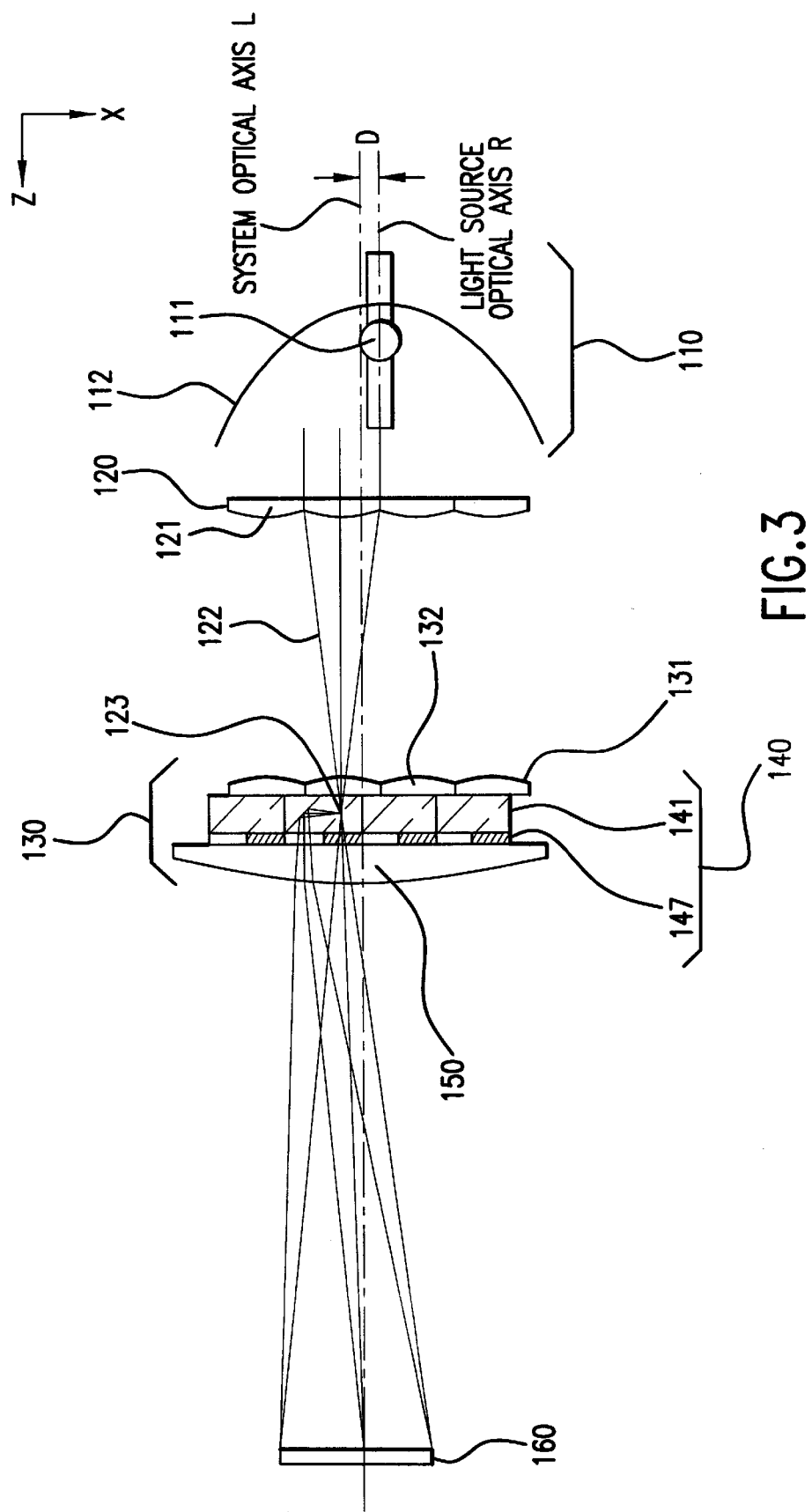
FIG. 3 is a view describing the function of a second optical element 130 in the polarized light beam illumination device 100.

The light beams emerging from the light source unit 110 have very high parallelity and because the light beam dividing lenses 121 constituting the first optical element 120 have very high accuracy, the respective intermediate light beams 122 are collected to very small regions on the polarized light separation surfaces 143 of the polarized light separation units 142 as shown in FIG. 3 described above. Actually, however, since the light emitting point of the light source lamp 111 has a definite size and the accuracy of the surface of the paraboloidal reflector 112 and the lens accuracy of the light beam dividing lenses 121 have dispersion, the images formed on the polarized light separation surfaces 143 by the respective intermediate light beams 122 have a certain degree of size. Although it is preferable that the size of the images is smaller than the size of the aperture cross-sectional area of the polarized light separation surfaces 143, if this is not so, there would be caused light beams which directly enter the reflection surfaces 144 disposed in proximity to the polarized light separation surfaces 143 without passing therethrough. Light beams directly entering the reflection surface of a certain polarized light separation unit (which is assumed as a "first polarized light separation unit") are reflected at the reflection surface, invade an adjacent polarized light separation unit (which is assumed as a "second polarized light separation unit) and are separated to two kinds of polarized light beams by the polarized light separation surface of the second polarized light separation unit. However, when the light beams which are reflected at the reflection surface of the first polarized light separation unit and enter the second polarized light separation unit are compared with the light beams which directly enter the polarized light separation surface of the second polarized light separation unit, the angle at which the former light beams enter the polarized light separation surface of the second polarized light separation unit is different from the angle at which the latter light beams enter it by 90 degrees. Therefore, the S-polarized light beams which invaded from the first polarized light separation unit and were reflected at the polarized light separation surface of the second polarized light separation unit are mixed with the light beams emerging from the P-polarized light beam emerging surface of the second polarized light separation unit. Further, the P-polarized light beams which invaded from the first polarized light separation unit and passed through the polarized light separation surface of the second polarized light separation unit are mixed with the light beams which emerging from the S-polarized light emerging surface of the second polarized light separation unit. As described above, light beams directly entering the reflection surface of a certain polarized light separation unit are polarized and separated in an adjacent polarized light separation unit in a state different from light beams directly entering the polarized light separation surface and emerge as polarized light beams having a polarization direction different from that of polarized light beams which are to be intrinsically caused to emerge from the P-polarized light beam emerging surface and the S-polarized light beam emerging surface, by which the degree of polarization of the light beams emerging from the polarized light beam illumination device is lowered. Since light beams which are effective as the light beams for illuminating the reflection type liquid crystal devices 300R, 300G, 300B are only one kind of polarized light beams among the light beams emerging from the polarized light beam illumination device, the drop in the degree of polarization of the light beams emerging from the polarized light beam illumination device is not preferable because it reduces the light utilization efficiency and accordingly the brightness of a projected image.

To cope with the above problem, the aforesaid polarized light beam illumination device 100 provides the light collection lens array 131 with the second optical element 130 and guides the light beams emerging from the first optical element 120 to the polarized light separation surface by the light collecting power of the light collection lens array 131 so that the light beams which directly enter the reflection surface are made as small as possible.

On the other hand, also effective to prevent light beams from directly entering the reflection surfaces 144 is a method of using a lens having a large light collecting ability for the reduction of the size of the images formed on the polarized light separation surfaces 143 by the respective intermediate light beams 122.

As will be understood from FIG. 10, when the light emerging side lens 150 is disposed at a position apart from the polarized light conversion element 140, the distance between the first optical element 120 and the polarized light separation unit array 141 is shortened so that there can be used the light beam dividing lenses 121 which have a focal length shorter than that of the light beam dividing lenses 121 in the polarized light beam illumination device 100, that is, a larger light collecting ability. Therefore, the size of the images formed on the polarized light separation surfaces 143 by the respective intermediate light beams 122 can be reduced, by which the light beams are prevented from directly entering the reflection surfaces 144.

Since the polarized light separating capability of the polarized light separation surfaces 143 changes depending upon the incident angle of light beams entering them, the light collecting force of the light beam dividing lenses 121 cannot be excessively increased. Therefore, when the parallelity of the light beams emerging from the light source unit 110 is not so high, it is preferable to use the light collection lens array 131 in addition to the disposition of the light emerging side lens 150 at the position apart from the polarized light separation unit array 141 as shown in the projection type display apparatus 5 of the embodiment.

The attachment of the light emerging side lens 150 to the light entering surface 204 of the polarization beam splitter 200 as shown in the projection type display apparatus 5 of the embodiment can reduce the light reflection at the boundary between the light emerging side lens 150 and the polarization beam splitter 200, by which the light utilization efficiency can be further increased.

Further, in the polarized light beam illumination device 100A of the projection type display apparatus 5 of the embodiment, the reflection mirror 700 for changing the traveling direction of the light beams about 90 degree is interposed between the polarized light separation unit array 141 and the light emerging side lens 150. Since the provision of the reflection mirror 700 permits the portion composed of the polarization beam splitter 200 and the cross-dichroic prism 420 to be disposed in parallel with the polarized light beam illumination device 100A, it is possible to make the optical system compact.

The reflection mirror 700 can be arranged as a totally reflecting mirror. However, when it is assumed that the reflection mirror 700 is a dielectric mirror for selectively reflecting only particular polarized light beams (the S-polarized light beams in the embodiment) obtained by the polarized light beam conversion element composed of the polarized light separation unit array 141 and the selective phase plate 147, the degree of polarization of the polarized light beams incident on the polarization beam splitter 200, that is, the degree of polarization of the illumination light for illuminating the reflection type liquid crystal devices 300R, 300G, 300B as a result can be increased. Therefore, the contrast of a projected image can be increased, by which the projected image of optimumly high quality can be obtained.

When the reflection mirror 700 is provided with a function for reflecting only visual light and causing infrared and ultraviolet to pass therethrough, the optical elements disposed rearward of the reflection mirror 700 can be prevented from being deteriorated by the infrared and ultraviolet.

Further, a position where the reflection mirror 700 is disposed is not limited to the position shown in FIG. 9 but it may be disposed at any position between the light source unit 110 and the polarization beam splitter 200. For example, when the light collection lens array 131, the polarized light separation unit array 141, the selective phase plate 147 and the light emerging side lens 150 which constitute the second optical element 130 are integrally arranged in the same way as polarized light beam illumination device 100, the reflection mirror 700 can be disposed between the light emerging side lens 150 the polarization beam splitter 200.

Note, the polarized light beam illumination device 100A of the embodiment can be replaced with the polarized light beam illumination device 100 in the projection type display apparatuses 1 to 4 of the first embodiment to the fourth embodiment mentioned above.

Second, the projection type display apparatus 5 of the embodiment is different from the projection type display apparatus 3 of the aforesaid third embodiment in that polarizing plates 210, 211 are disposed to the light entering surface 204 and the light emerging surface 205 of the polarization beam splitter 200. The polarizing plate 210 increases the degree of polarization of the polarized light beams incident on the polarization beam splitter 200, that is, the degree of polarization of the illumination light for illuminating the reflection type liquid crystal devices 300R, 300G, 300B. Further, the polarizing plate 211 increases the degree of polarization of the polarized light beams emerging from the polarization beam splitter 200, that is, the contrast of the image projected on a display surface or a projection surface through the projection optical system 500. In the projection type display apparatus 5 of the embodiment, the disposition of the polarizing plates 210, 211 can increase the contrast of the projected image, by which the projected image of optimumly high quality can be obtained.

The polarizing plates 210, 211 need not be always disposed on the surfaces of the polarization beam splitter 200 but it suffices only to dispose them on the light path between the light emerging side lens 150 and the polarization beam splitter 200 or the light path between the polarization beam splitter 200 and the projection optical system 500. However, the disposition of the polarizing plates 210, 211 on the surfaces of the polarization beam splitter 200 can reduce the light reflection at the boundaries between the polarizing plates 210, 211 and the polarization beam splitter 200, by which the light utilization efficiency can be improved.

Note, the polarizing plates 210, 211 of this embodiment may be provided with the projection type display apparatuses 1 to 4 of the first embodiment to the fourth embodiment.

Since the projection type display apparatus 5 of the embodiment is the same as the projection type display apparatus 3 of the third embodiment except the portion mentioned above, it also has the same effect as that of the projection type display apparatus 3 of the third embodiment.

(Sixth Embodiment)

Figure 11:
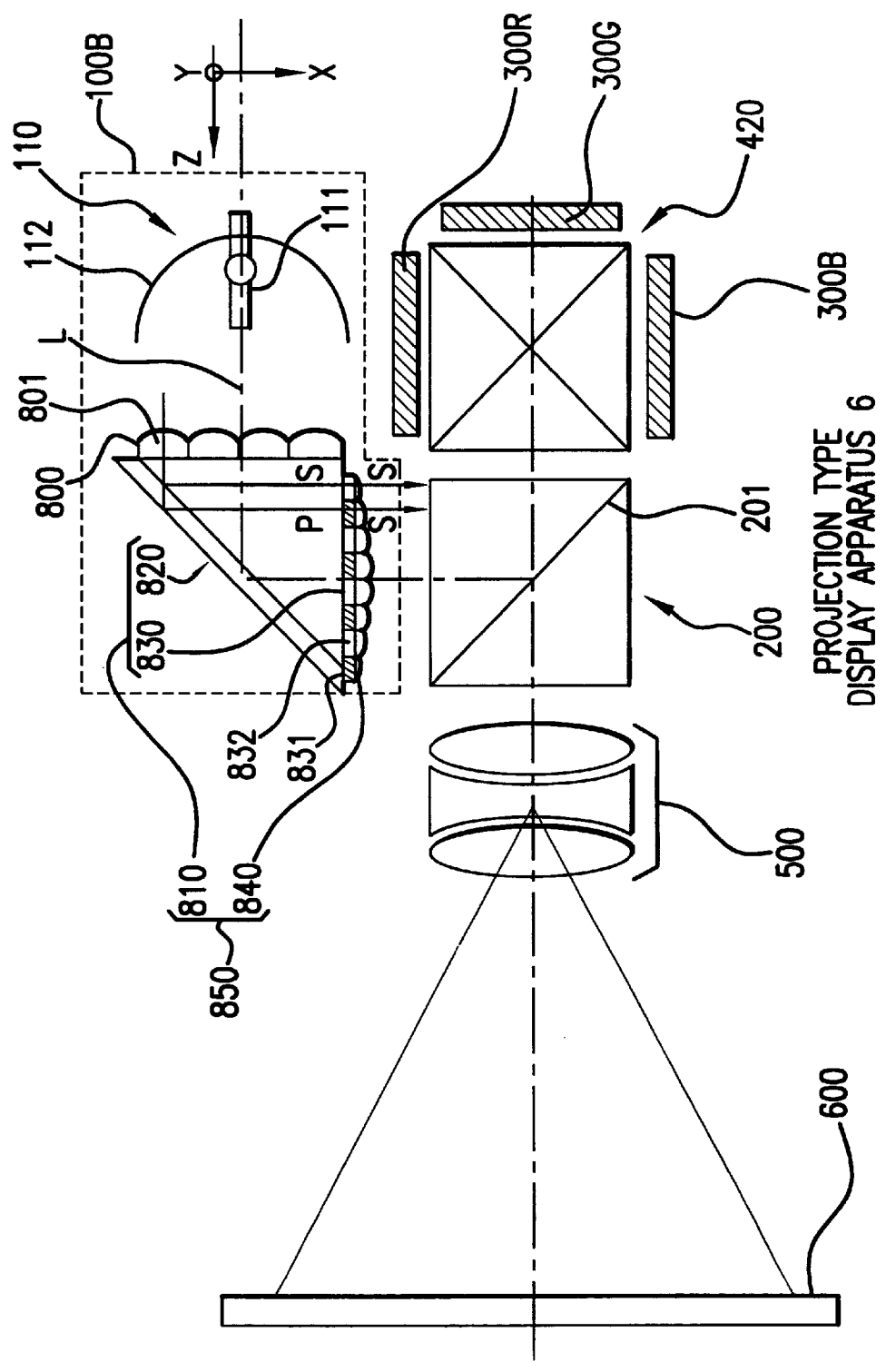
FIG. 11 is a schematic view showing the arrangement of the main portion of a projection type display apparatus 6 of the sixth embodiment.

FIG. 11 is a schematic view showing the arrangement of the main portion of a projection type display apparatus 6 of the sixth embodiment in a planar view. Note, FIG. 11 is a sectional view taken along the X-Z plane passing through the center of a first optical element 800. The projection type display apparatus 6 of the embodiment is a modification of the projection type display apparatus 3 of the aforesaid third embodiment. The same arrangements as those of the projection type display apparatus 3 of the aforesaid third embodiment are denoted by the same numerals as those used in FIG. 7 and the detailed description thereof is omitted.

First, the arrangement of the polarized light beam illumination device of the projection type display apparatus 6 of the embodiment is different from that of the projection type display apparatus 3 of the aforesaid third embodiment.

A polarized light beam illumination device 100B in the projection type display apparatus 6 is roughly composed of the light source unit 110, the first optical element 800 and a second optical element 850 disposed along the system optical axis L.

The first optical element 800 is a lens array composed of a plurality of rectangular light beam dividing lenses 801 disposed on a matrix shape in the same way as the first optical element 120 shown in FIG. 2. The light source unit 110 is disposed so that the optical axis of the light source lamp 111 coincides with the center of the first optical element 120. The light beams emerging from the light source unit 110 entering the first optical element 800 are divided into a plurality of intermediate light beams by the light beam dividing lenses 801 and enter the second optical element 850.

Note, the characteristics of the respective light beam dividing lenses 801 are optimized in accordance with the thickness and the like of the plate-shaped prism 823 of a polarized light separation prism 820 which will be described later in detail.

The second optical element 850 disposed on the side of the light emerging surface of the first optical element 800 is roughly composed of a polarized light conversion element 810 composed of the polarized light separation prism 820 and a selective phase plate 830; and a light emerging side lens 840 for superimposing the intermediate light beams emerging from the polarized light conversion element 810 on the reflection type liquid crystal devices 300R, 300G, 300B as regions to be illuminated.

Figure 12A:
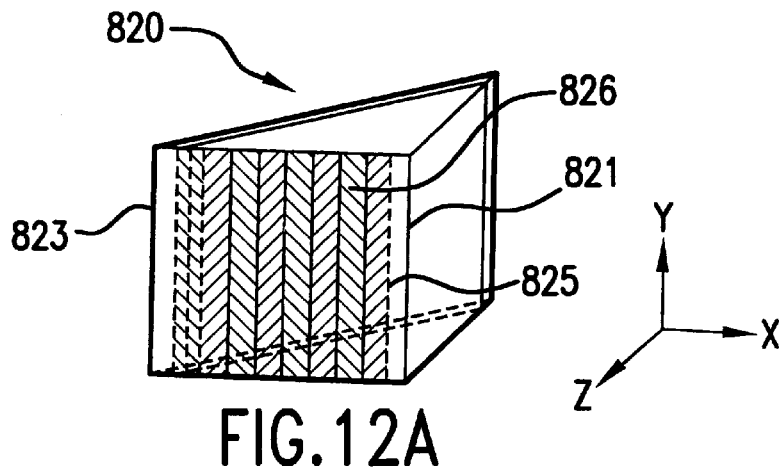
FIG. 12(A) is a perspective view showing the arrangement of a polarized light separation prism 820 in a polarized light beam illumination device 100B.
Figure 12B:
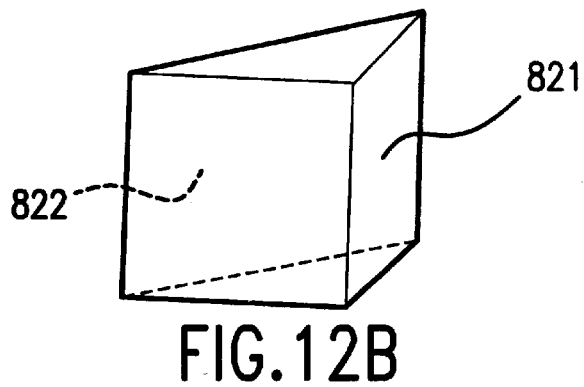
FIG. 12(B) is a perspective view showing the arrangement of a triangular-shaped prism 821 having a bottom surface formed to a rectangular equilateral triangle of the polarized light separation prism 820.
Figure 12C:
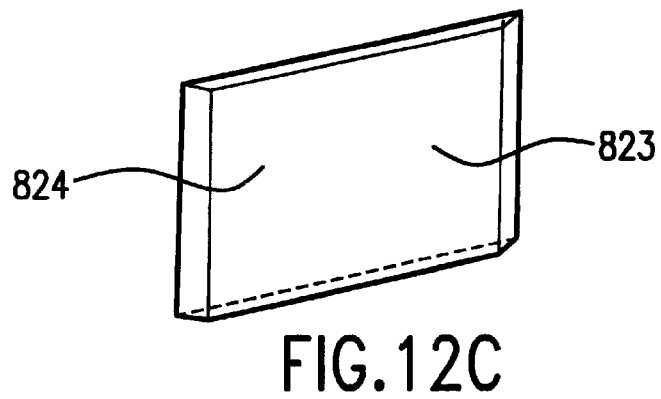
FIG. 12(C) is a perspective view showing the arrangement of a plate-shaped prism 823 of the polarized light separation prism 820.

As shown in FIG. 12(A) to FIG. 12(C), the polarized light separation prism 820 is composed of a triangular-prism-shaped prism 821 combined with a plate-shaped prism 823, the polarized light separation prism 820 having an inclined surface to which a polarized light separation film 822 is formed and a bottom surface formed to a rectangular equilateral triangle and the plate-shaped prism 823 having a refection film 824 formed to a surface thereof which is not joined to the triangular-prism-shaped prism 821. The polarized light separation film 822 is disposed approximately in parallel with the refection film 824. The polarized light separation film 822 can be formed of a dielectric multilayer or the like and the refection film 824 can be formed of an aluminum film cartridge or the like.

The light beams incident on the polarized light separation prism 820 are separated to P-polarized light beams which pass through the polarized light separation film 822 and S-polarized light beams which are reflected at the polarized light separation film 822 and change their traveling direction toward the selective phase plate 830. The P-polarized light beams enter the plate-shaped prism 823 and are reflected at the refection film 824 so as to change their traveling direction and are made approximately parallel with the S-polarized light beams. That is, the intermediate light beams with random polarization directions entering the polarized light separation prism 820 are separated to the S-polarized light beams and the P-polarized light beams by the polarized light separation film 822 of the polarized light separation prism 820. Then, the S-polarized light beams are caused to emerge from the S-polarized light beam emerging surfaces 825 shown by rightward-upward inclined lines in FIG. 12(A) and the P-polarized light beams are caused to emerge from the P-polarized light beam emerging surfaces 826 shown by rightward-downward inclined lines in FIG. 12(A) in approximately the same directions, respectively.

Note, the width in the X-direction of each of the S-polarized light beam emerging surfaces 825 and the P-polarized light beam emerging surface 826 in FIG. 12(A) is set in correspondence to the thickness in the Z- and X-directions of the plate-shaped prism 823. In the embodiment, the thickness in the Z- and X-directions of the plate-shaped prism 823 are set to about ½ of the size in the X-direction of the light beam dividing lenses 801 constituting the first optical element (see FIG. 2). Therefore, the width in the X-direction of each of the S-polarized light beam emerging surfaces 825 and the P-polarized light beam emerging surfaces 826 is also set to about ½ of the pitch of the light beam dividing lenses 801.

As shown in FIG. 11, the selective phase plate 830 to which $\lambda/2$ phase layers 831 are regularly formed are disposed on the side of the light emerging surface of the polarized light separation prism 820. The selective phase plate 830 is an optical element arranged such that the $\lambda/2$ phase layers 831 are formed only on the portion of the P-polarized light beam emerging surfaces 826 of the polarized light separation prism and no $\lambda/2$ phase layer 831 is formed on the portion of the S-polarized light beam emerging surfaces 825. Therefore, as shown in FIG. 11, when the P-polarized light beams emerging from the polarized light separation prism 820 pass through the selective phase plate 830, they are subjected to a rotational action in a polarization direction by the $\lambda/2$ phase layers 831 and are converted into the S-polarized light beams. On the other hand, since no $\lambda/2$ phase layer 831 is formed to the portion of the S-polarized light beam emerging surfaces 825, the S-polarized light beams emerging from the S-polarized light beam emerging surfaces 825 of the polarized light separation prism 820 pass through the selective phase plate 830 as they are.

That is, the intermediate light beams with the random polarization directions emerging from the first optical element 800 are separated to the P-polarized light beams and the S-polarized light beams by the polarized light separation prism 820 and converted into approximately the one kind of the polarized light beams having approximately similarly arranged polarization direction (the S-polarized light beams in the embodiment).

Figure 13:
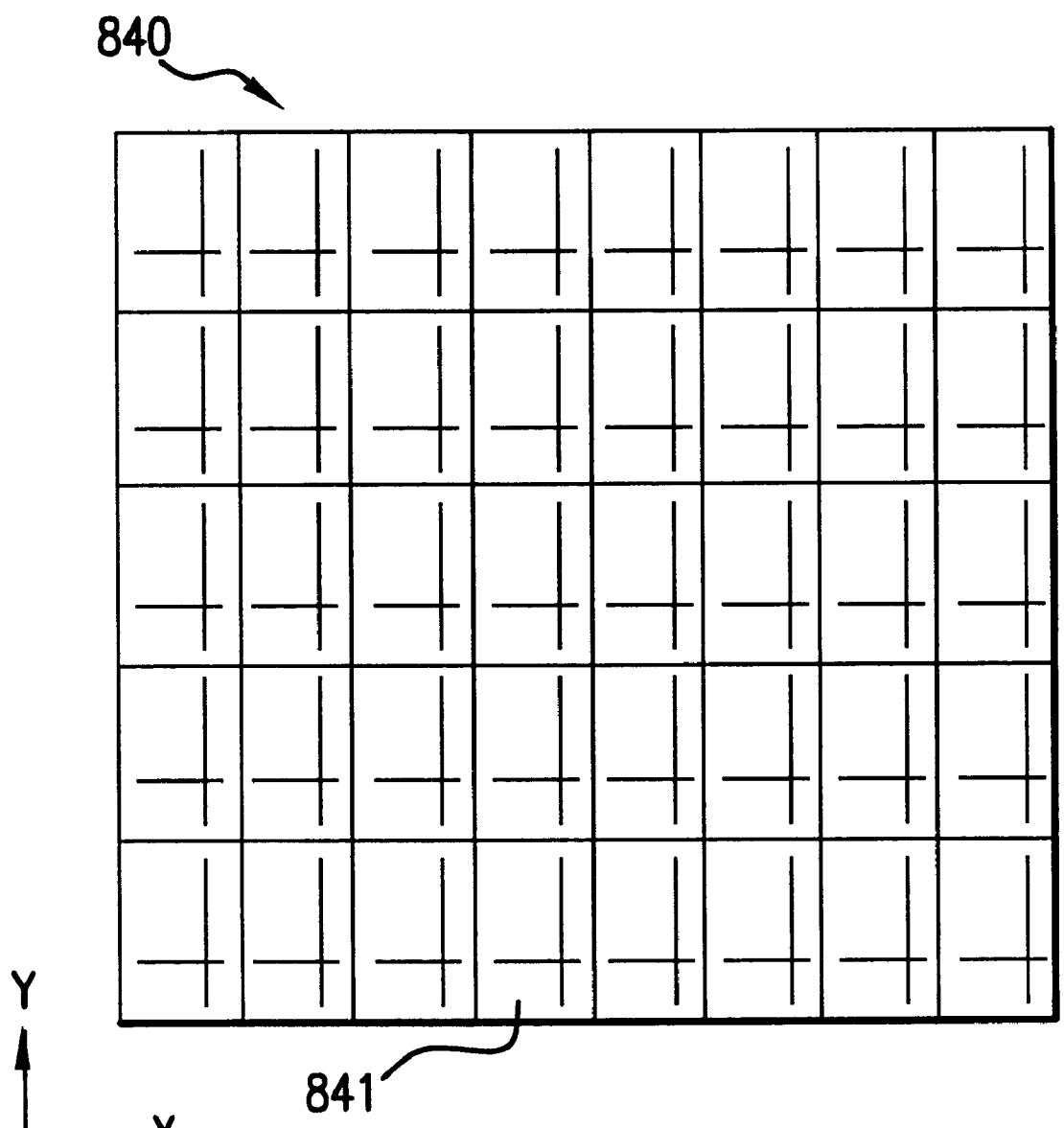
FIG. 13 is a perspective view showing the arrangement of a light emerging side lens 840 in the polarized light beam illumination device 100B.
Figure 14:
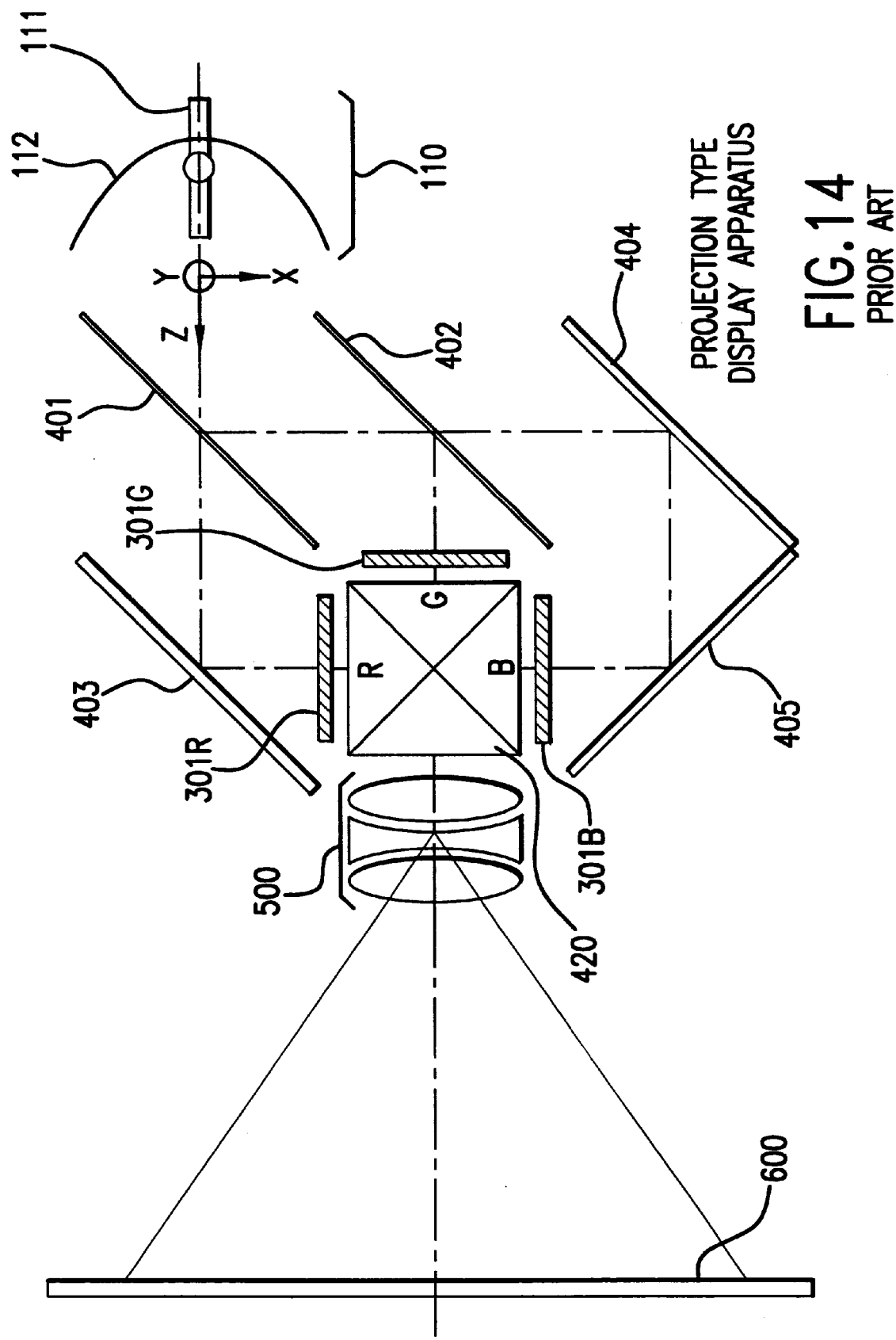
FIG. 14 is a schematic view showing the arrangement of the main portion of a conventional projection type display apparatus.

As shown in FIG. 13, the light emerging side lens 840 disposed on the side of the light emerging surface of the polarized light conversion element 810 is a lens array composed of a plurality of rectangular lenses 841 disposed to a matrix shape. In FIG. 13, a cross intersection shows the optical axis of the lens. As understood from the figure, each of the rectangular lenses 841 is arranged as an eccentric lens. The light emerging side lens 840 has a function as a superimposing element for superimposing the respective intermediate light which are similarly arranged by the polarized light conversion element 810 on the reflection type liquid crystal devices 300R, 300G, 300B as the regions to be illuminated likewise the light emerging side lens 150 in the polarized light beam illumination device 100. That is, each of the intermediate light beams divided by the first optical element 800 (that is, the image surfaces cut out by the light beam dividing lenses 801) are superimposed on the region to be illuminated at the one position by the polarized light conversion element 810. Thus, the reflection type liquid crystal devices 300R, 300G, 300B as the regions to be illuminated can be approximately uniformly illuminated by the one kind of the polarized light beams.

Note, the pitch at which the rectangular lenses 841 are disposed in the X-direction is approximately the same as the width in the X-direction of each of the S-polarized light beam emerging surfaces 825 and the P-polarized light beam emerging surfaces 826 of the polarized light separation prism 820. Further, in the embodiment, the pitch at which the rectangular lenses 841 are disposed in the Y-direction is set to approximately the same as the pitch at which the light beam dividing lenses 801 of the first optical element are disposed in the Y-direction.

However, the disposition pitch of the rectangular lenses in the X-direction may be approximately equal to the sum of the width in the X-direction of each of the S-polarized light beam emerging surfaces 825 of the polarized light separation prism 820 and the width in the X- direction of each of the P-polarized light beam emerging surface 826 thereof. In this case, a lens array similar to the first optical element 800 can be used as the light emerging side lens 840. Otherwise, the disposition pitch of the rectangular lenses in the X-direction may be made smaller than the sum of the width in the X-direction of each of the S-polarized light beam emerging surfaces 825 of the polarized light separation prism 820 and the width in the X-direction of each of the P-polarized light beam emerging surface 826 thereof. Likewise, the disposition pitch in the Y-direction of the rectangular lenses 841 may be made smaller than the disposition pitch in the Y-direction of the light beam dividing lenses 801. The above state can be realized by arranging the light beam dividing lenses 801 which constitute the first optical element 800 as the eccentric lenses. Since the cross-sectional area of the light beams incident on the polarization beam splitter 200 can be reduced by the above arrangement, there is an effect that the size of the polarization beam splitter 200 can be reduced as a result.

To summarize, illumination light having uniform brightness and the approximately similarly arranged polarization direction can be also obtained by the polarized light beam illumination device 100B likewise the polarized light beam illumination device 100.

In the polarized light beam illumination device 100B, the light beams emerging from the light source unit 110 are divided into the plurality of intermediate light beams by the first optical element 800 and the intermediate light beams are separated to the S-polarized light beams and the P-polarized light beams in the cross-sectional area approximately similar to the cross-sectional area of the respective intermediate light beams. Thus, there is a feature that the light beams emerging from the light source can be separated into the two kinds of polarized light beams without increasing the width of the light beams and accordingly the conversion of the polarized light beams can be carried out in a small space.

Note, the cross-sectional shape of the light beam dividing lenses 801 constituting the first optical element 800 is made in a rectangular shape which is long in the X-direction in conformity with the shape of the display region of the reflection type liquid crystal device 300, that is, the shape of the region to be illuminated (the rectangular shape long in the X-direction) as well as the two kinds of the polarized light beams emerging from the polarized light separation prism 820 are alternately arranged in the X-direction. As a result, even if the rectangular region to be illuminated is illuminated, no light is wasted and the light utilization efficiency can be increased.

Further, the optically integral arrangement of the first optical element and the second optical element which is composed of the polarized light separation prism 820, the selective phase plate 830 and the light emerging side lens 840 permits the light loss caused at the boundaries thereof to be reduced and further increases the light utilization efficiency. However, these optical elements need not be always optically integrally arranged.

The projection type display apparatus 6 of the embodiment can obtain the light beams with uniform brightness as the illuminating light beams since it uses the aforesaid polarized light beam illumination device 100B. Thus, a very uniform and optimumly bright projected image can be obtained over the entire display surface or projection surface.

Further, since the polarized light beams are converted and the traveling direction of the light beams is changed about 90 degrees simultaneously in the polarized light beam illumination device 100B, the optical system can be made compact without the need of the disposition of a reflection mirror for changing the traveling direction of the light beams different from the aforesaid projection type display apparatus 5.

Note, when the projection type display apparatus 6 of the embodiment also disposes polarizing plates to the light entering surface and the light emerging surface of the polarization beam splitter 200 to increase the degree of polarization likewise the aforesaid projection type display apparatus 5 of the fifth embodiment, the contrast of the projected image can be increased and the projected image of very high quality can be obtained.

(Others)

Not only the S-polarized light beams are obtained by the polarized light beam illumination device in the aforesaid respective embodiments, but also the P-polarized light beams may be obtained by it. In this case, it is acceptable to form the λ/2 phase layers 148, 831 of the selective phase plates 147, 830 to the S-polarized light beam emerging surfaces 146, 825 of the polarized light separation unit array 141 or the polarized light separation prism 820.

Further, although the projection type display apparatus includes a front type in which a projected image is observed from the surface of the projection surface 600 which is located on the side of the projection optical system 500 and a rear type in which the projected image is observed from the surface thereof which is located opposite to the projection optical system 500, the present invention is applicable to any of the types.

As described above, according to the projection type display apparatus of the present invention, since the length of the light path can be shortened as compared with that of the conventional projection type display apparatuses, the bright projected image can be obtained without the use of a large diameter projecting lens. Further, since uneven brightness in the region to be illuminated can be reduced, the very uniform and optimumly bright projected image can be obtained over the entire display surface or projection surface.

Industrial Applicability

The projection type display apparatus of the present invention is applicable to project and display an image output from, for example, a computer and a video recorder on a screen.

What is claimed is:

1. A projection type display apparatus, comprising:

a light source;

a first optical element for collecting light beams from said light source and dividing the light beams into a plurality of intermediate light beams;

a second optical element disposed on a side of a light emerging surface of said first optical element;

only one reflection type modulation element for modulating light beams emerging from said second optical element; and a polarized light beam selection element disposed on a light path between said second optical element and said reflection type modulation element for reflecting the light beams emerging from said second optical element or causing the light beams to pass therethrough to thereby cause the light beams to reach said reflection type modulation element as well as causing light beams modulated by said reflection type modulation element to pass therethrough or reflecting the modulated light beams to thereby cause the modulated light beams to reach a projection optical system, wherein said second optical element comprises:
a polarized light conversion element separating each of intermediate light beams into P-polarized light beams and S-polarized light beams and modifying a polarization direction of a first one of the P-polarized light beams and the S-polarized light beams to have a same polarization direction as a second one of the P-polarized light beams and the S-polarized light beams; and a superimposing element disposed on a side of a light emerging surface of said polarized light conversion element to receive the polarized light beams and superimposing each of the polarized light beams on said reflection type modulation element.

2. A projection type display apparatus according to claim 1, wherein said polarized light conversion element comprises a polarized light separation unit array including a plurality of polarized light separation units each having a polarized light separation surface and a selective phase plate on which $\lambda/2$ phase layers are regularly formed.

3. A projection type display apparatus according to claim 2, wherein said superimposing element is disposed at a position located apart from said polarized light conversion element.

4. A projection type display apparatus according to claim 3, wherein said superimposing element is attached to a light entering surface of said polarized light beam selection element.

5. A projection type display apparatus according to claim 2, wherein a polarizing plate is disposed on a side of a light entering surface of said polarized light beam selection element.

6. A projection type display apparatus according to claim 2, wherein a polarizing plate is disposed on a light path between said polarized light beam selection element and said projection optical system.

7. A projection type display apparatus, comprising:
a light source;
a first optical element for collecting light beams from said light source and dividing the light beams into a plurality of intermediate light beams;
a second optical element disposed on a side of a light emerging surface of said first optical element;
a color light separation/combination element for separating light beams emerging from said second optical element into three color light beams and combining the three color light beams, the three reflection type modulation elements modulating the three color light beams, respectively; and
a polarized light beam selection element disposed on a light path between said second optical element and said color light separation/combination element for reflecting the light beams emerging from said second optical element or causing the light beams to pass therethrough to thereby cause the light beams to reach said color light separation/combination element and causing light beams combined by said color light separation/combination element to pass therethrough or reflecting the combined light beams to thereby cause the combined light beams to reach a projection optical system, wherein, said second optical element comprises:
a polarized light conversion element separating each of intermediate light beams into P-polarized light beams and S-polarized light beams and modifying a polarization direction of a first one of the P-polarized light beams and the S-polarized light beams to have a same polarization direction as a second one of the P-polarized light beams and the S-polarized light beams; and a superimposing element disposed on a side of a light emerging surface of said polarized light conversion element to receive the polarized light beams and superimposing each of the light polarized beams on said reflection type modulation element.

8. A projection type display apparatus according to claim 7, wherein said polarized light conversion element comprises a polarized light seperation unit array including a plurlity of polarized light seperation units having a polarized light seperation surface and a reflection surface and a selective phase plate on which $\lambda/2$ phase layers are regularly formed.

9. A projection type display apparatus according to claim 8, wherein said superimposing element is disposed at a position located apart from said polarized light conversion element.

10. A projection type display apparatus according to claim 9, wherein said superimposing element is attached to a light entering surface of said polarized light beam selection element.

11. A projection type display apparatus according to claim 8, wherein a reflection mirror for changing a light traveling direction is disposed between said light source and said polarized light beam selection element.

12. A projection type display apparatus according to claim 11, wherein said reflection mirror is composed of a dielectric mirror for selectively reflecting only particular polarized light beams obtained by said polarized light conversion element and disposed between said light source and said polarized light beam selection element.

13. A projection type display apparatus according to claim 7, wherein said polarized light conversion element is composed of a polarized light separation prism and a selective phase plate on which $\lambda/2$ phase layers are regularly formed, said polarized light separation prism being made by combining a triangular-column-shaped prism having an inclined surface on which a polarized light separation film is formed with a plate-shaped prism having a refection film formed on a surface thereof so that the polarized light separation film is approximately in parallel with the reflection surface.

14. A projection type display apparatus according to claim 8, wherein:
said color light separation/combination element is composed of a dichroic prism having a dichroic film disposed between two prism parts; and
said polarized light beam selection element is composed of a polarization beam splitter having a polarized light beam selection film disposed between two prism parts, one of the two prism parts constituting said dichroic prism being integrally arranged with one of the two prism parts constituting said polarization beam splitter.

15. A projection type display apparatus according to claim 8, wherein said color light separation/combination element includes first and second dichroic prisms each having a dichroic film disposed between two prism parts, one of the two prism parts constituting said first dichroic prism being integrally arranged with one of the prism parts constituting said second dichroic prism.

16. A projection type display apparatus according to claim 15, wherein a light transmission prism is further disposed on said color light separation/combination element and one of the prism parts constituting said first or second dichroic prism is integrally arranged with said light transmission prism.

17. A projection type display apparatus according to claim 8, wherein:

said color light seperation/combination element is composed of a cross-dichroic prism having dichroic film disposed between four prism parts in X-shaped; and said three reflection type modulation elements are disposed along three adjacent sides of said cross-dichroic prism.

18. A projection type display apparatus according to claim 17, wherein said polarized light beam selection element is composed of a polarization beam splitter having a polarized light beam selection film disposed between two prism parts and one of the two prism parts constituting said polarization beam splitter is integrally arranged with any one of the four prism parts constituting said cross-dichroic prism.

19. A projection type display apparatus according to claim 8, wherein said color light separation/combination element is composed of a dichroic prism in which two dichroic films for separating and combining the three color light beams, respectively are disposed at a different angle with respect to an optical axis.

20. A projection type display apparatus according to claim 8, wherein a polarizing plate is disposed on a light path between said light source and said polarized light beam selection element.

21. A projection type display apparatus according to claim 8, wherein a polarizing plate is disposed on a light path between said polarized light beam selection element and said projection optical system.

22. A projection type display apparatus according to claim 13, wherein:

said color light separation/combination element is composed of a dichroic prism having a dichroic film disposed between two prism parts; and said polarized light beam selection element is composed of a polarization beam splitter having a polarized light beam selection film disposed between two prism parts, one of the two prism parts constituting said dichroic prism being integrally arranged with one of the two prism parts constituting said polarization beam splitter.

23. A projection type display apparatus according to claim 13 wherein said color light separation/combination element includes first and second dichroic prisms each having a dichroic film disposed between two prism parts, one of the two prism parts constituting said first dichroic prism being integrally arranged with one of the prism parts constituting said second dichroic prism.

24. A projection type display apparatus according to claim 13 wherein:

said color light separation/combination element is composed of a cross-dichroic prism having a dichroic film disposed between four prism parts in an X-shape; and said three reflection type modulation elements are disposed along three adjacent sides of said cross-dichroic prism.

25. A projection type display apparatus according to claim 13 wherein said color light separation/combination element is composed of a dichroic prism in which two dichroic films for separating and combining the three color light beams, respectively are disposed at a different angle with respect to an optical axis.

26. A projection type display apparatus according to claim 13, wherein a polarizing plate is disposed on a light path between said light source and said polarized light beam selection element.

27. A projection type display apparatus according to claim 13, wherein a polarizing plate is disposed on a light path between said polarized light beam selection element and said projection optical system.

* * * * *